United States Patent

Ono

(10) Patent No.: US 9,110,218 B2
(45) Date of Patent: Aug. 18, 2015

(54) IMAGING DEVICE

(71) Applicant: FUJIFILM CORPORATION, Tokyo (JP)

(72) Inventor: Shuji Ono, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/492,098

(22) Filed: Sep. 22, 2014

(65) Prior Publication Data

US 2015/0009395 A1    Jan. 8, 2015

Related U.S. Application Data

(63) Continuation of application No. PCT/JP2013/055793, filed on Mar. 4, 2013.

(30) Foreign Application Priority Data

Mar. 21, 2012  (JP) ................. 2012-063840

(51) Int. Cl.

| G02B 7/02 | (2006.01) |
| H04N 5/225 | (2006.01) |
| H04N 5/232 | (2006.01) |
| G03B 17/12 | (2006.01) |

(52) U.S. Cl.
CPC .............. *G02B 7/021* (2013.01); *H04N 5/2254* (2013.01); *H04N 5/23212* (2013.01); *G03B 17/12* (2013.01)

(58) Field of Classification Search
None
See application file for complete search history.

(56) References Cited

U.S. PATENT DOCUMENTS

| 8,854,525 B2* | 10/2014 | Imamura ..................... 348/335 |
| 2005/0275904 A1* | 12/2005 | Kido et al. ................... 358/461 |
| 2008/0218612 A1* | 9/2008 | Border et al. ................ 348/262 |
| 2008/0283724 A1* | 11/2008 | Goto ........................ 250/201.6 |
| 2009/0027542 A1* | 1/2009 | Yamamoto et al. ........... 348/340 |
| 2009/0129767 A1* | 5/2009 | Son et al. .................... 396/127 |
| 2010/0110272 A1* | 5/2010 | Sugawara .................... 348/341 |
| 2010/0141802 A1* | 6/2010 | Knight et al. .............. 348/240.3 |
| 2010/0283884 A1* | 11/2010 | Hayasaka et al. ............ 348/340 |

(Continued)

FOREIGN PATENT DOCUMENTS

| JP | 2006-184844 | 7/2006 |
| JP | 2010-271429 | 12/2010 |

(Continued)

OTHER PUBLICATIONS

International Preliminary Report—PCT/JP2013/055793—Feb. 26, 2014.

(Continued)

*Primary Examiner* — Michael Osinski
(74) *Attorney, Agent, or Firm* — Young & Thompson

(57) ABSTRACT

An imaging device according to one mode of the present invention includes a taking lens formed of two or more physically separated lenses and having a plurality of regions each having an individual focal distance corresponding to a combination of the two more lenses, an image pickup element having a plurality of light-receiving sensors provided to correspond to the plurality of regions, the plurality of light-receiving sensors each selectively receiving a light beam passing through any of the plurality of regions, and an image generating unit which generates an image of a subject from an imaging signal outputted from the image pickup element.

21 Claims, 24 Drawing Sheets

(56) References Cited

U.S. PATENT DOCUMENTS

| | | |
|---|---|---|
| 2011/0063484 A1* | 3/2011 | Fujii et al. ............ 348/294 |
| 2011/0122223 A1 | 5/2011 | Gruber et al. |
| 2011/0169997 A1* | 7/2011 | Nagano et al. ............ 348/340 |
| 2012/0212662 A1* | 8/2012 | Shimoda et al. ............ 348/349 |
| 2012/0224096 A1* | 9/2012 | Shimoda et al. ............ 348/349 |
| 2012/0229688 A1* | 9/2012 | Tajiri ............ 348/335 |
| 2013/0070146 A1* | 3/2013 | Imamura ............ 348/335 |
| 2013/0107017 A1* | 5/2013 | Endo ............ 348/49 |
| 2013/0120564 A1* | 5/2013 | Imamura ............ 348/135 |
| 2013/0258098 A1* | 10/2013 | Ikemoto ............ 348/135 |
| 2013/0329042 A1* | 12/2013 | Murata et al. ............ 348/140 |
| 2014/0055575 A1* | 2/2014 | Imamura et al. ............ 348/49 |
| 2014/0071317 A1* | 3/2014 | Yamagata et al. ............ 348/279 |
| 2014/0139645 A1* | 5/2014 | Ono ............ 348/49 |
| 2014/0152779 A1* | 6/2014 | Ono ............ 348/49 |
| 2014/0168498 A1* | 6/2014 | Ono ............ 348/335 |
| 2014/0176681 A1* | 6/2014 | Ono ............ 348/49 |
| 2014/0232928 A1* | 8/2014 | Ono ............ 348/349 |

FOREIGN PATENT DOCUMENTS

| | | |
|---|---|---|
| JP | 2011-205406 | 10/2011 |
| JP | 2011-259218 | 12/2011 |
| WO | 2011/066239 | 6/2011 |

OTHER PUBLICATIONS

International Search Report—PCT/JP2013/055793—Jun. 11, 2013.

* cited by examiner

FIG.9
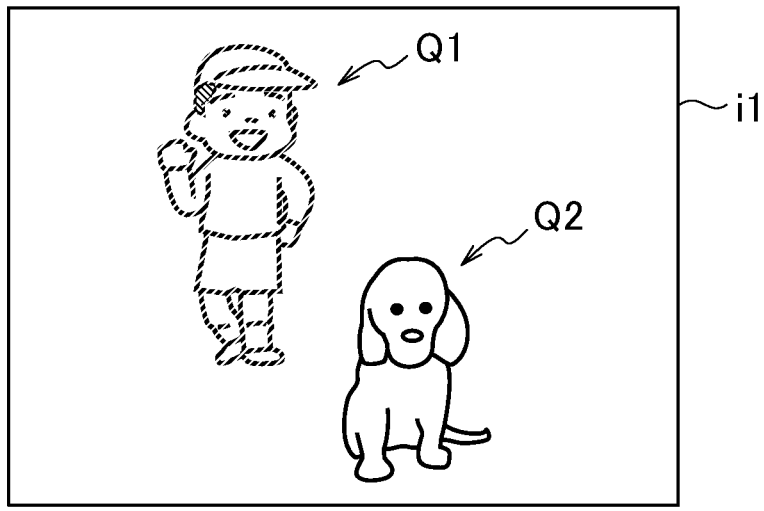
(a)
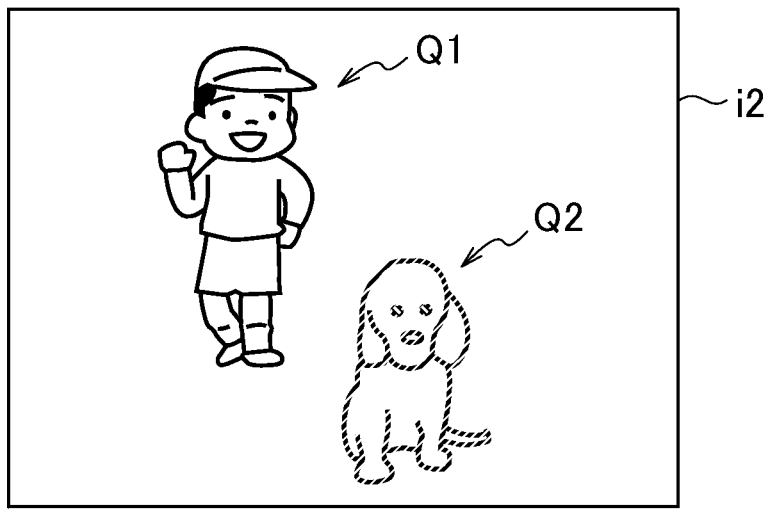
(b)
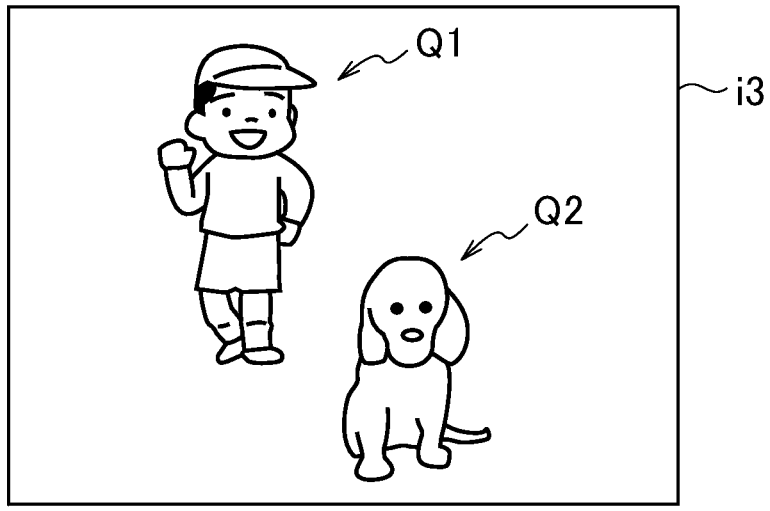
(c)

FIG.11
(a)
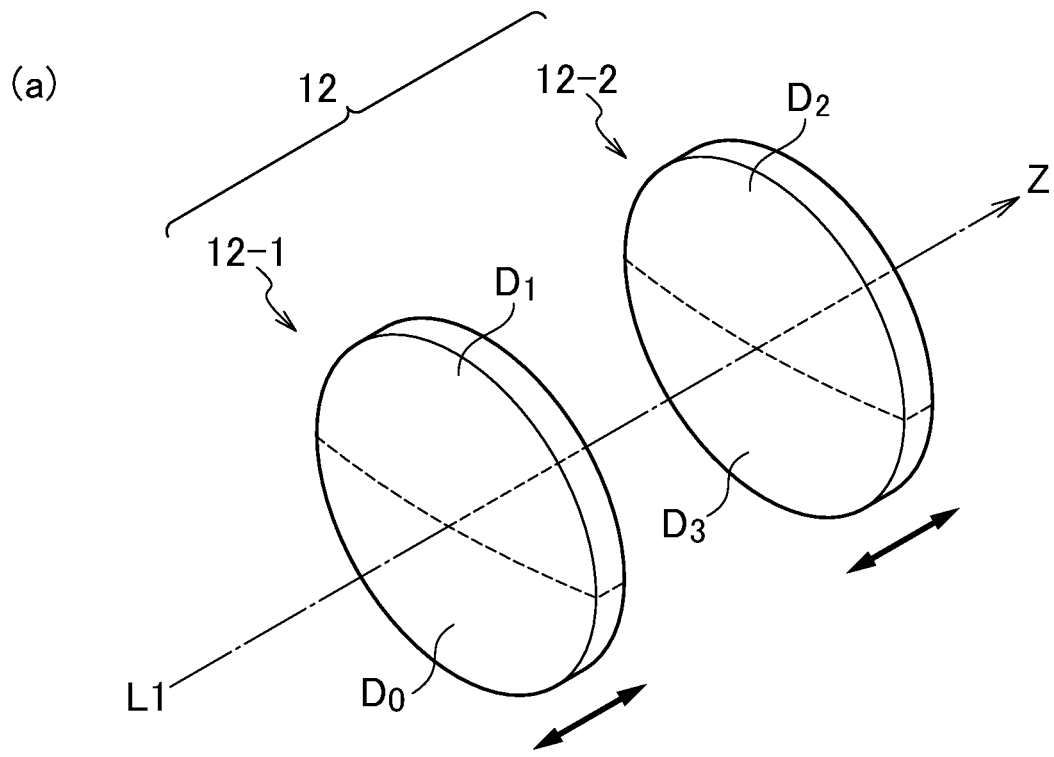
(b)
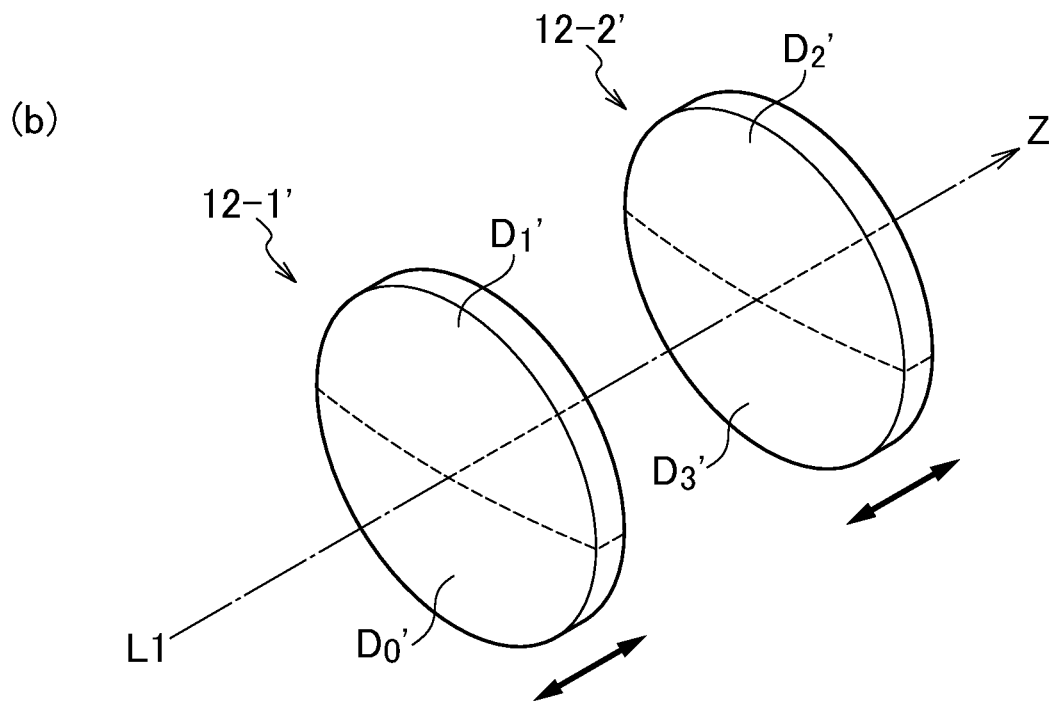

FIG.12
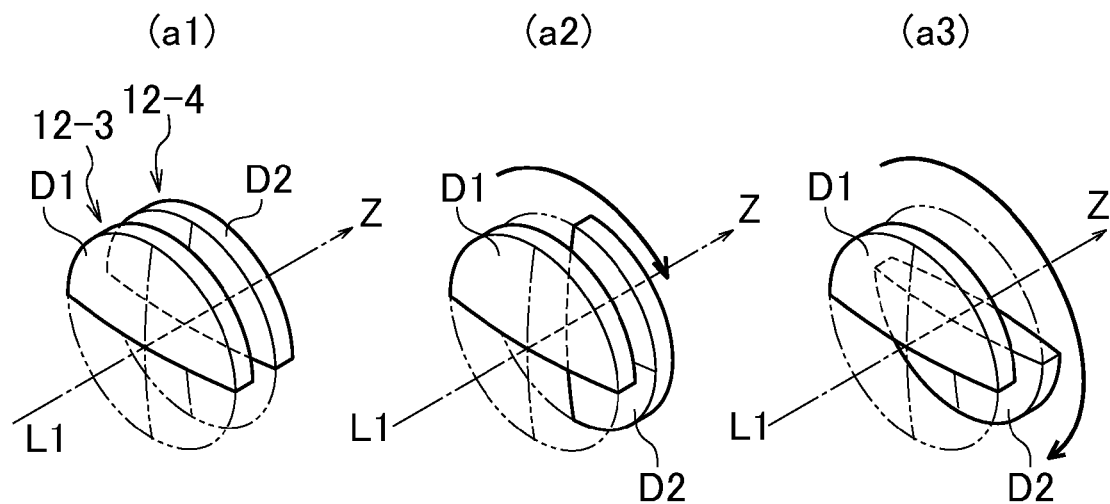
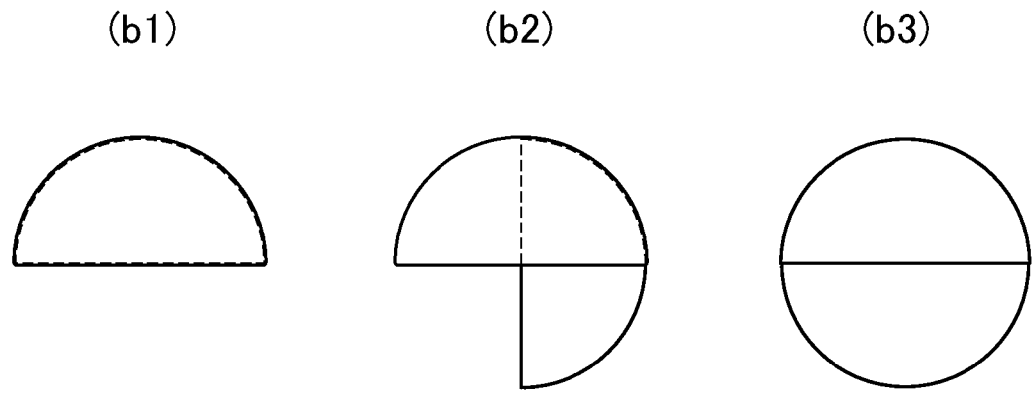
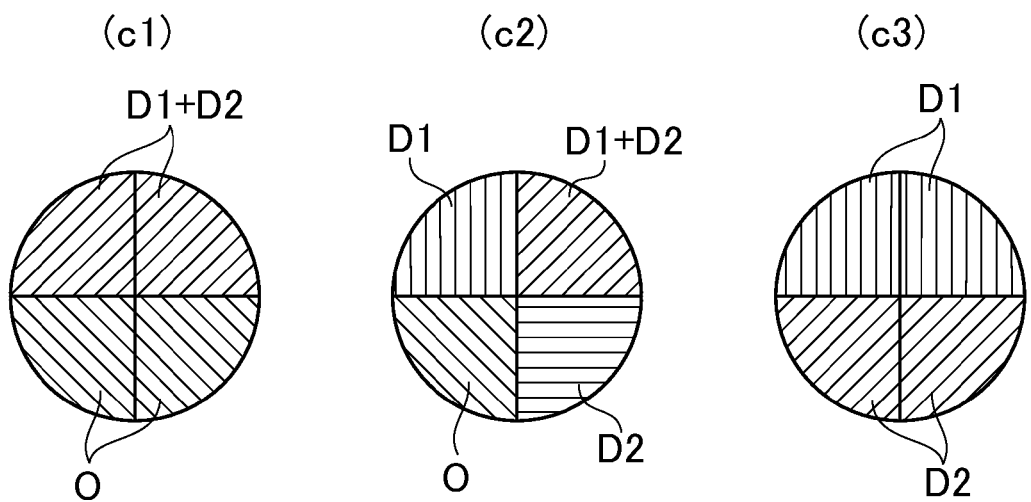

FIG.23
(a) 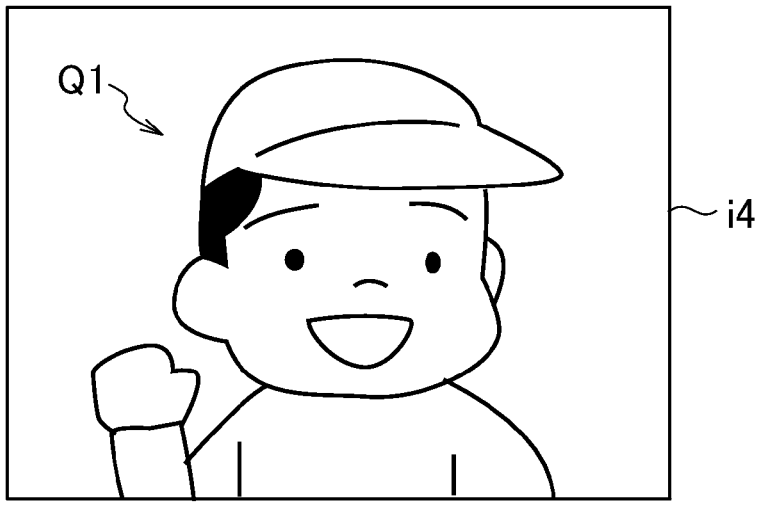
(b) 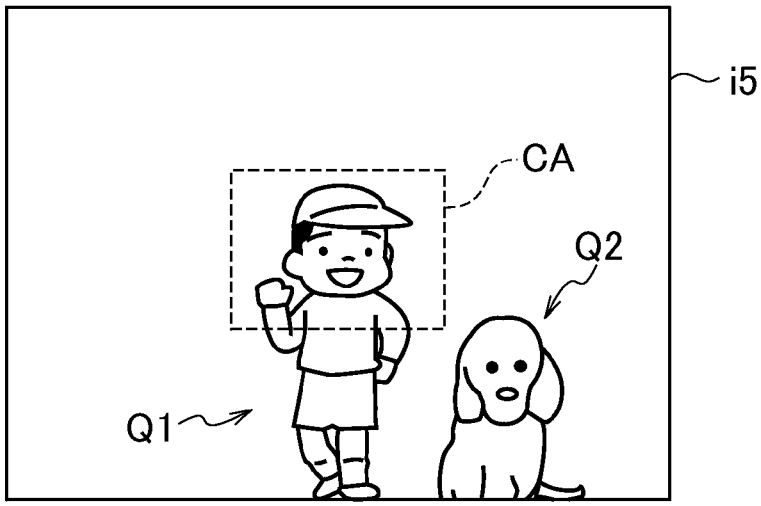
(c) 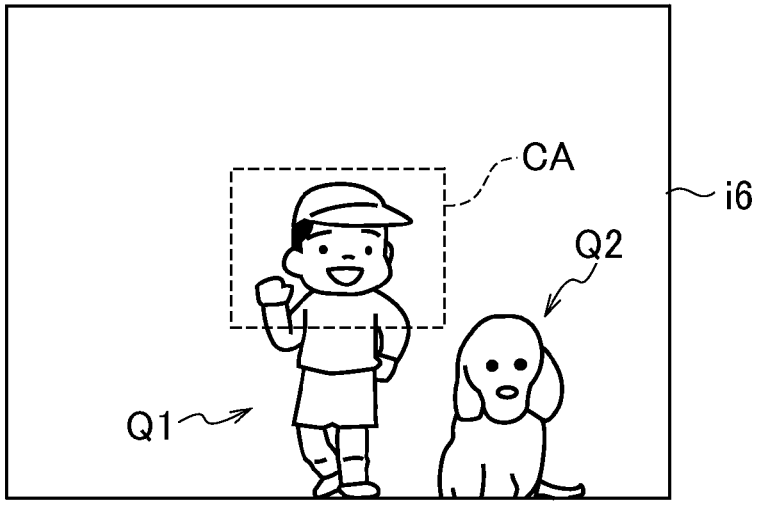

IMAGING DEVICE

CROSS-REFERENCE TO RELATED APPLICATIONS

This application is a Continuation of PCT International Application No. PCT/JP2013/0055793 filed on Mar. 4, 2013, which claims priority under 35 U.S.C §119(a) to Japanese Patent Application No. 2012-63840 filed on Mar. 21, 2012. Each of the above application(s) is hereby expressly incorporated by reference, in its entirety, into the present application.

BACKGROUND OF THE INVENTION

1. Field of the Invention

The present invention relates to imaging devices and, in particular, to an imaging device capable of obtaining a plurality of images with different characteristics.

2. Description of the Related Art

In the field of imaging devices, a technique has been known in which a plurality of images with different characteristics are obtained by imaging a plurality of times with varied imaging conditions or using lens systems having a plurality of characteristics and the obtained images are processed according to the purpose (for example, refer to Japanese Patent Application Laid-Open No. 2010-271429; PTL 1 and Japanese Patent Application Laid-Open No. 2006-184844; PTL 2). In the imaging device described in PTL 1, taking lens systems for far distance and near distance are configured of a plurality of semicircular lenses, and a far distance image and a near distance image are obtained each from a half of each image pickup element. Also, in the imaging device described in PTL 2, an optical member is arranged between a test object and an image plane. By rotating the optical member about an optical axis or moving the optical member in an optical axis direction or by cutting one lens into semicircular portions and arranging these portions with their positions in the optical axis direction being shifted, images of a plurality of test objects spaced apart from each other in the optical axis direction are formed on the same image plane.

SUMMARY OF THE INVENTION

However, in these conventional techniques, there are various problems in obtainment of a plurality of images with different characteristics. For example, when images with different characteristics are obtained with a plurality of times of imaging, it takes time to obtain images. Also, since imaging timing varies among the images, followability to a change of imaging conditions such as a change of the position of the subject is low. Moreover, when a plurality of images with different characteristics is obtained with the schemes as in PTL 1 and PTL 2, image quality may be degraded. For example in the technique described in PTL 1, since the far distance image and the low distance image are separated from each other by image formation in different regions of the image pickup element (one light-receiving cell itself can receive a plurality of optical signals with different characteristics), signals cannot be sufficiently separated depending on the region of the image pickup element (in particular, such as a location near a boundary between a far distance image region and a near distance image region), thereby degrading image quality. Moreover in the technique described in the above-described PTL 2, images of a plurality of test objects spaced apart from each other in the optical axis direction are simultaneously formed on one light-receiving element (light-receiving cell). Therefore, when only an image with a specific characteristic is desired to be obtained, the obtained image signals have to be separated, thereby putting a burden on processing performance of the imaging device. Furthermore, the signals are not sufficiently separated to degrade image quality.

The present invention was made in view of these circumstances, and has an object of providing an imaging device capable of quickly and easily obtaining a desired image while ensuring favorable image quality.

To achieve the object described above, an imaging device according to a first mode of the present invention includes a taking lens formed of two or more physically separated lenses and having a plurality of regions each having an individual focal distance corresponding to a combination of the two or more lenses, an image pickup element having a plurality of light-receiving sensors provided to correspond to the plurality of regions, the plurality of light-receiving sensors each selectively receiving a light beam passing through any of the plurality of regions, and an image generating unit which generates an image of a subject from an imaging signal outputted from the image pickup element.

In the first mode, the "focal distance" refers to a distance represented by the following equation, that is, a distance from the light-receiving plane of a light-receiving sensor to a subject having a focal relation with the light-receiving sensor.

$$FD = a + b \qquad \text{(Equation 1)}$$

FD: focal distance
a: distance between the lens and the light-receiving plane of the light-receiving sensor
b: distance between the lens and the focal position Note that when the focal length is f, $1/f = (1/a) + (1/b)$, and the focal distance FD varies depending on the combination of the distances a and b even with the same focal length f. Conversely, the focal distance FD can be set the same depending on the combination of the distances a and b even with different focal length f.

In the first mode, the focal distances of the respective regions of the taking lens are independent from each other, and the focal distance of each region may be set according to the imaging purpose and the subject. Specifically, if the focal distances of the respective regions are different from each other, a plurality of images with different characteristics (focal distances) can be obtained. In this case, it is not required to spend time in imaging repeatedly many times, the subject position is not shifted between images, and images can be obtained quickly and easily. Also, in the case of an equal focal distance of each region, a single image with a favorable resolution and light amount can be obtained.

Also, as described above, the imaging device according to the first mode includes an image pickup element having a plurality of light-receiving sensors each selectively receiving a light beam passing through any of the plurality of regions, image quality is not degraded with a plurality of image signals superposed on an output signal from one light-receiving cell, and a process of separating an unwanted image signal does not have to be performed. Therefore, a desired image with favorable image quality can be easily obtained. Note that selective light receiving by the light-receiving sensors can be achieved by an optical element such as a light-shielding member, a liquid-crystal shutter, or a liquid-crystal prism provided on the light-receiving plane or ahead thereof.

As such, in the imaging device according to the first mode, a desired image can be quickly and easily obtained while favorable image quality is ensured. Note in the first mode that the focal distance may be fixed or variable.

In an imaging device according to a second mode of the present invention, in the first mode, the taking lens includes multi-focus lenses with different focal distances of the plurality of regions, and the image generating unit generates a plurality of images according to the focal distances of the plurality of the regions. Therefore, in the imaging device according to the second embodiment, a plurality of images at different focal distances can be simultaneously obtained. Note that also in the second embodiment, as with the first embodiment, the focal distance may be fixed or variable.

In an imaging device according to a third mode of the present invention, in the second mode, the multi-focus lens is formed of a plurality of lens units corresponding to the plurality of regions, the plurality of lens units having an approximately equal distance arranged at different positions in an optical axis direction. As described above, since the focal length f and the distance a and the distance b have a relation of $(1/f)=(1/a)+(1/b)$, if the focal lengths of the plurality of lens units are approximately equal to each other and the positions in an optical axis direction are different from each other, the focal distance $FD(=a+b)$ also has a different value for each region. The third mode describes one mode of a specific structure so that multi-focus lens has a plurality of different focal lengths.

Note in the third mode that an "approximately equal" focal length is not restricted to a completely equal focal length, but can also include the case in which the focal length varies to the extent to which the user visually recognizing an image cannot clearly understand a difference in image magnification of the same subject.

In an imaging device according to a fourth mode of the present invention, in any of the first to third modes, a focal distance changing unit is provided which changes at least one of the focal distances of the plurality of regions. In the third mode, a focused image can be obtained by changing the focal distance changed according to the distance of the subject and a change thereof.

In an imaging device according to a fifth mode of the present invention, in the fourth modes, the focal distance changing unit changes at least one of the focal distances of the plurality of regions by moving at least one of the two or more lenses in the optical axis direction. The fifth mode describes one mode of a focal distance change.

In an imaging device according to a sixth mode of the present invention, in the fourth or fifth mode, the focal distance changing unit changes at least one of the focal distances of the plurality of regions by rotating at least one of the two or more lenses about an optical axis. The sixth mode describes another mode of a focal distance change. At least one of the two or more lenses is rotated about the optical axis to change the combination of regions through which light beams passes, thereby changing the focal distance.

In an imaging device according to a seventh mode of the present invention, in any of the fourth to sixth modes, an optical member with a plurality of lenses disposed therein is provided, and the focal distance changing unit changes at least one of the focal distances of the plurality of regions by moving the optical member so that any of the plurality of lenses is positioned on the optical axis of the taking lens.

The seventh mode describes still another mode of a focal distance change. Even in this mode, a focused image can be obtained for subjects at different distances. Note in the seventh mode that an optical member having a plurality of lenses with different focal distances and focal lengths arranged in a circle may be moved by rotation, or an optical member having these lenses linearly arranged may be linearly moved.

An imaging device according to an eighth mode of the present invention, in any of the fourth to seventh modes, includes a distance information obtaining unit which obtains information about a distance to the subject, and a focal distance change control unit which controls the focal distance changing unit so that at least one subject is in focus in any of the plurality of regions according to a distribution of subject distances obtained. In the eighth mode, the focal distance change control unit is controlled according to a distribution of subject distances, and a focused image can be automatically obtained.

Note in the eighth mode that the distance information of the subject can be detected by any of various methods, such as a method using phase difference information or a method based on contrast of imaging signals.

In an imaging device according to a ninth mode of the present invention, in any of the second to eighth modes, the image generating unit generates a single image by combining a plurality of images according to the focal distances of the plurality of regions. In the ninth mode, for example, a single image can be generated with a plurality of subjects at different distances in focus.

In an imaging device according to a tenth mode of the present invention, in any of the first to ninth modes, the image generating unit generates a single image by using imaging signals from the plurality of light-receiving sensors corresponding to a plurality of regions with an equal focal distance among the plurality of regions. In the tenth mode, an image is generated by using imaging signals from the light-receiving sensors corresponding to the plurality of regions. Therefore, an image with a favorable resolution and light amount can be obtained. Also, since imaging signals in regions with the equal focal distance are used for image generation, image quality is not degraded even if an imaging signal in a different focal state is mixed.

In an imaging device according to an eleventh mode of the present invention, in the first mode, the taking lens is a taking lens with different focal lengths of the plurality of regions and an equal focal distance of the plurality of regions, and the image generating unit generates a plurality of images according to the focal lengths of the plurality of regions. Here, while the degree of appropriately varying the focal distances between regions depends on the imaging conditions such as the type of the subject, the user when visually recognizing an image can grasp a difference in image magnification. With this, in the eleventh mode, a plurality of images with different image magnifications (for example, a wide-angle image and a telescopic image) of the same subject can be simultaneously obtained. Also, since imaging signals in regions with the equal focal distance are used for image generation, a plurality of image in the same focused state can be obtained. Note in the eleventh mode that an "equal focal distance" is not restricted to a completely equal focal distance, but can also include the case in which the focal distance varies to the extent to which the user visually recognizing an image cannot clearly understand a difference in focused state.

In an imaging device according to a twelfth mode of the present invention, in the eleventh mode, a focal length changing unit which changes at least one of the focal lengths of the plurality of regions is provided. In the eleventh mode, an image with a desired image magnification can be obtained by changing the focal length.

In an imaging device according to a thirteenth mode of the present invention, in the twelfth mode, the focal length changing unit changes at least one of the focal lengths of the plurality of regions by moving at least one of the two or more lenses in the optical axis direction. The thirteenth mode describes one mode of a focal length change.

In an imaging device according to a fourteenth mode of the present invention, in the twelfth or thirteenth mode, an optical member with a plurality of lenses disposed therein is provided, the focal length changing unit changes at least one of the focal lengths of the plurality of regions by moving the optical member so that any of the plurality of lenses is positioned on an optical axis of the taking lens. In the optical member, a plurality of lenses with different focal distances and focal lengths can be arranged. The fourteenth mode describes another mode of a focal length change.

In an imaging device according to a fifteenth mode of the present invention, in any of the eleventh to fourteenth modes, the image generating unit generates a single image from a plurality of imaging signals corresponding to the plurality of regions, and among the plurality of imaging signals, imaging signals for use in generating a partial region in the single image are more than imaging signals for use in generating regions other than the partial region. In the fifteenth mode, for example, a wide-angle image and a telescopic image can be combined together. In this case, in the combined image, for a region corresponding to the telescopic image, an image can be generated by using both of an imaging signal from a wide-angle image light-receiving cell and an imaging signal from a telescopic image light-receiving cell (two image signals). In the combined image, for a region other than the region corresponding to the telescopic image, an image can be generated by using only the imaging signal from the wide-angle light-receiving cell (one image signal). Thus, image quality (resolution and brightness) more favorable than that in a region other than the telescopic portion can be obtained in the region corresponding to the telescopic image. Therefore, if a main subject is imaged so as to be positioned in an overlapping region between the wide-angle image and the telescopic image (for example, the center of the imaging range), an image with favorable image quality can be obtained for the main subject.

In an imaging device according to a sixteenth mode of the present invention, in the fifteenth mode, the single image has a resolution in the partial region higher than resolutions of regions other than the partial region. The sixteenth mode specifically describes details of improvement in image quality by the fifteenth mode.

To achieve the object described above, a seventeenth mode of the present invention includes a taking lens formed of one lens obtained by arranging a plurality of lens units as being shifted and by integrating the plurality of lenses, the plurality of lens units having an approximately equal focal length and corresponding to different regions, an image pickup element having a plurality of light-receiving sensors provided so as to correspond to the plurality of regions, the plurality of light-receiving sensors each selectively receiving a light beam passing through any of the plurality of regions, and an image generating unit which generates an image of a subject from an imaging signal outputted from the image pickup element. In the seventeenth mode, since the plurality of lens units with the equal focal length are arranged so that the positions in the optical axis direction are shifted, from the above-described relation $(1/f)=(1/a)+(1/b)$, a plurality of images with different focal distances can be simultaneously obtained. Therefore, it is not required to spend time in imaging repeatedly many times, and the subject position is not shifted between images. Also, since the imaging device according to the seventeenth mode includes an image pickup element having a plurality of light-receiving sensors which each selectively receives a light beam passing through any of the plurality of regions, image quality is not degraded with a plurality of image signals superposed on an output signal from one light-receiving cell, and a process of separating an unwanted image signal does not have to be performed. Therefore, a desired image with favorable image quality can be easily obtained.

Note in the seventeenth mode that "an approximately equal focal length" is not restricted to a completely equal focal length, but can also include the case in which the focal length varies to the extent to which the user visually recognizing an image cannot clearly understand a difference in image magnification of the same subject.

As described above, according to the present invention, a desired image can be quickly and easily obtained with ensured favorable image quality.

BRIEF DESCRIPTION OF THE DRAWINGS

FIG. 9 depicts examples of multi-focus images in the imaging device 10.

FIG. 11 depicts a mode in which the taking lens 12 is configured of a circular lens.

FIG. 12 depicts the state of a focal distance change by rotation of half-moon-shaped lenses.

FIG. 23 depicts the state of image obtainment in the third embodiment.

DETAILED DESCRIPTION OF THE PREFERRED EMBODIMENTS

Modes for carrying out the imaging device according to the present invention are described in detail below according to the attached drawings.

<First Embodiment>
<Structure of Imaging Device>

Figure 1:
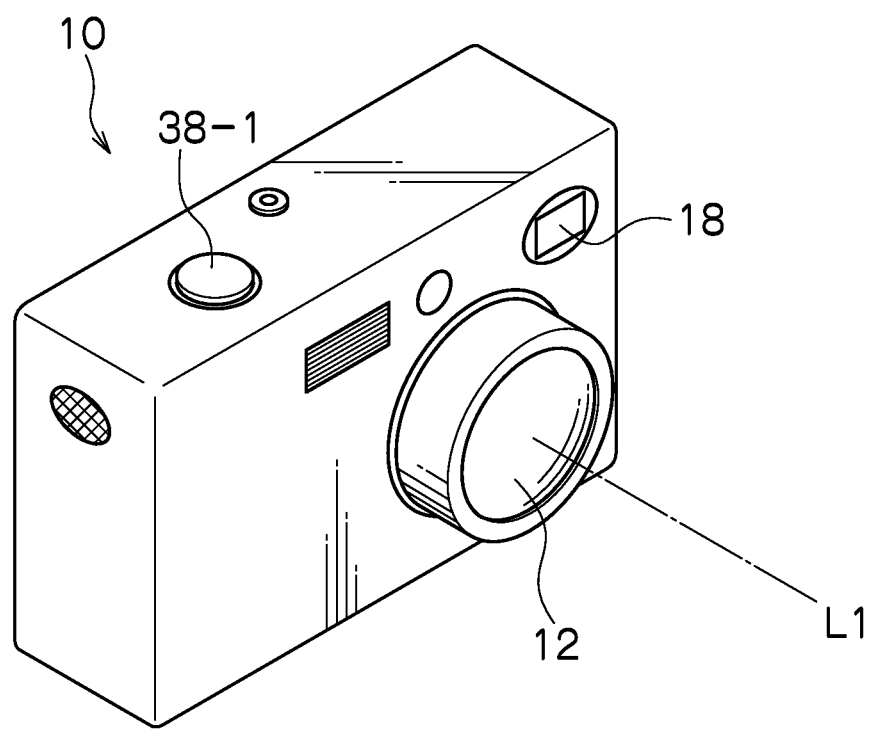
FIG. 1 is a front perspective view of an imaging device 10 according to a first embodiment of the present invention.
Figure 2:
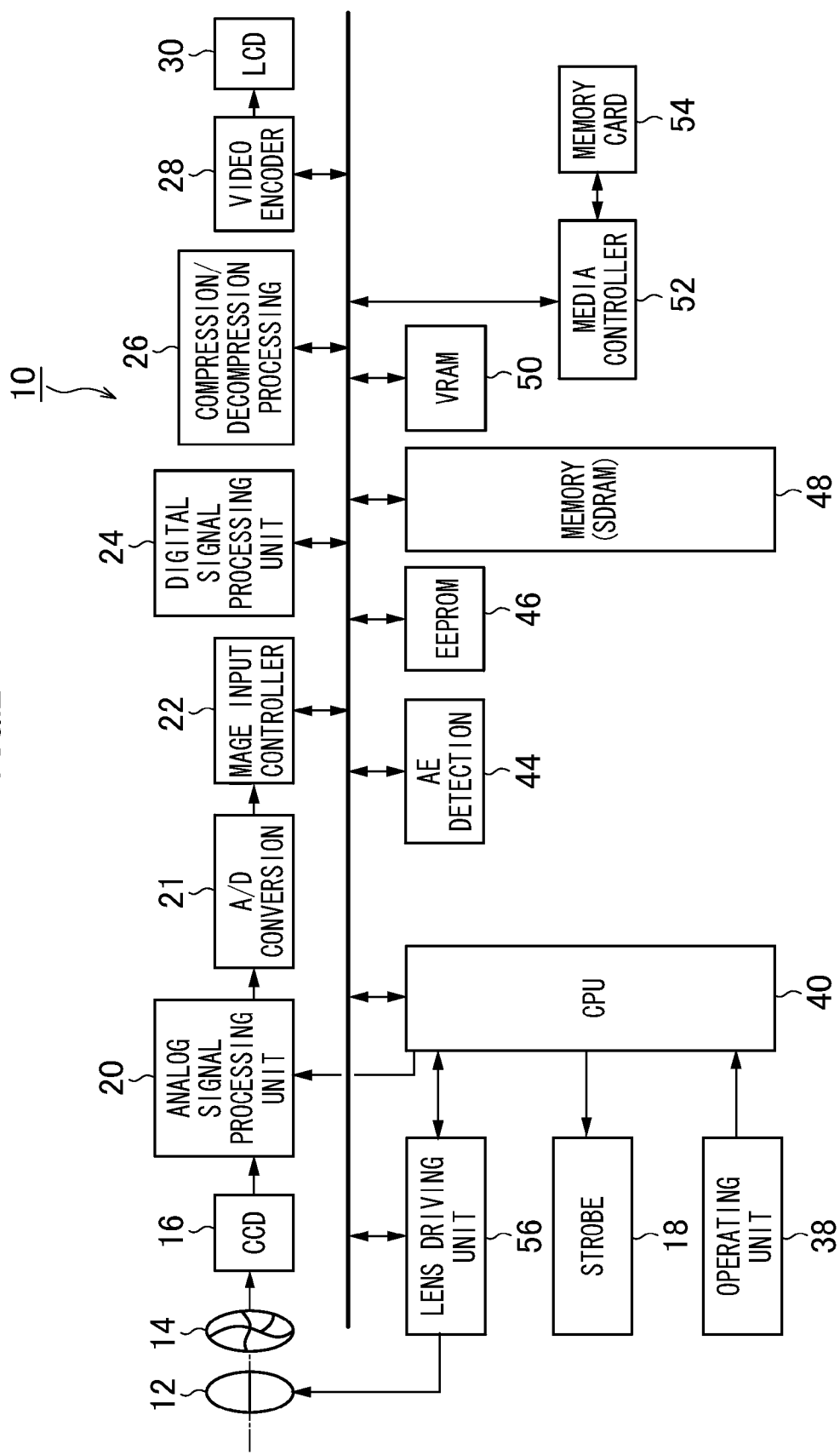
FIG. 2 is a block diagram depicting the structure of main parts of the imaging device 10.

FIG. 1 is an external perspective view of an imaging device 10 (imaging device) according to a first embodiment of the present invention, and FIG. 2 is a block diagram depicting the structure of main parts of the imaging device 10. As depicted in FIG. 1, the imaging device 10 has a front surface where a taking lens 12, a strobe 18, and so on are arranged and an upper surface where a release button 38-1 is provided. L1 denotes an optical axis of the taking lens 12.

FIG. 2 is a block diagram depicting depicting the structure of main parts of the imaging device 10. The operation of the entire imaging device 10 is controlled in a centralized manner by a central processing unit (CPU) 40, and programs (including programs for use in image generation/combing processing, which will be described further below) and parameters are stored in an EEPROM (Electronically Erasable and Programmable Read Only Memory) 46.

The imaging device 10 is provided with an operating unit 38 including, in addition to the release button 38-1, a mode dial, a replay button, a MENU/OK key, a cross key, a BACK key, and so on. A signal from this operating unit 38 is inputted in the CPU 40. Based on the input signal, the CPU 40 controls each circuit of the imaging device 10.

The release button 38-1 is operating device for inputting an instruction for starting imaging, and is configured of a two-step-stroke type switch formed of so-called a "half press" and a "full press". The imaging device 10 outputs an S1-ON signal when the release button 38-1 is pressed halfway down and an S2-ON signal when the release button 38-1 is pressed fully from a half press. When an S1-ON signal is outputted, an imaging preparation process is performed such as automatic exposure control (AE process). When an S2-ON signal is outputted, an imaging process is performed. Note that the release button 38-1 is not restricted to the form of the two-step-stroke type button formed of a half press and a full press and may output an S1-ON signal and an S2-ON signal with one operation. Alternatively, separate buttons may be provided to output an S1-ON signal and an S2-ON signal. Also, in a form in which an instruction for operating the imaging device 10 is provided through a touch panel or the like, an instruction for operation may be outputted by touching a region corresponding to that instruction for operation displayed on a touch-type panel as operating device. In the present invention, the form of the operating device is not restricted to the above as long as the device makes an instruction for an imaging preparation process and an imaging process. Also, with one instruction for operation provided to single operating device, an imaging preparation process and an imaging process may be continuously performed. The mode dial is device which selects a still-picture/moving-picture taking mode, a manual/auto imaging mode, an imaging scene, and so on.

The replay button is a button for switching to a replay mode in which a still picture or a moving picture of images taken and recorded is displayed on a liquid-crystal monitor 30. The MENU/OK key is an operation key including both of a function for making an instruction for causing a menu to be displayed on a screen of the liquid-crystal monitor 30 and a function for making an instruction for entering and performing a selected content. The cross key is an operating unit for inputting instructions in four directions, that is, upward, downward, leftward, and rightward, and functions as cursor moving operation device, a zoom switch, a frame-advance button at the time of a replay mode, and so on. The BACK key is used to delete a desired target such as a selected item, cancel an instructed content, return to an immediately previous operation state, or the like. These buttons and keys can be used also for an operation necessary in image extraction and combining process.

In an imaging mode, an image of image light representing a subject is formed on a light-receiving plane of a solid image pickup element (image pickup element: hereinafter referred to as a "CCD") 16 via a taking lens 12 (multi-focus lens) and an iris 14. The taking lens 12 is driven by a lens driving unit 36 controlled by the CPU 40 to have a focal distance and a focal length changed.

The taking lens 12 has a region 12a with a long focal distance (hereinafter referred to as a far focal region) and a region 12b with a focal distance shorter than that of the far focal region 12a (hereinafter referred to as a near focal region). As depicted in portion (a) of FIG. 3, regions each in a half-moon shape when viewed from the front are provided above and below a lens center O1, and are the far focal region 12a and the near focal region 12b in the order from the lower portion. And, these two focal regions act as two lenses physically separated from each other to form the taking lens as a whole. In these regions, specific focal length values may be set according to the imaging purpose and so on. Note that the far focal region 12a and the near focal region 12b may be arranged at different positions in the optical axis direction as depicted in portion (b) of FIG. 3.

Figure 4:
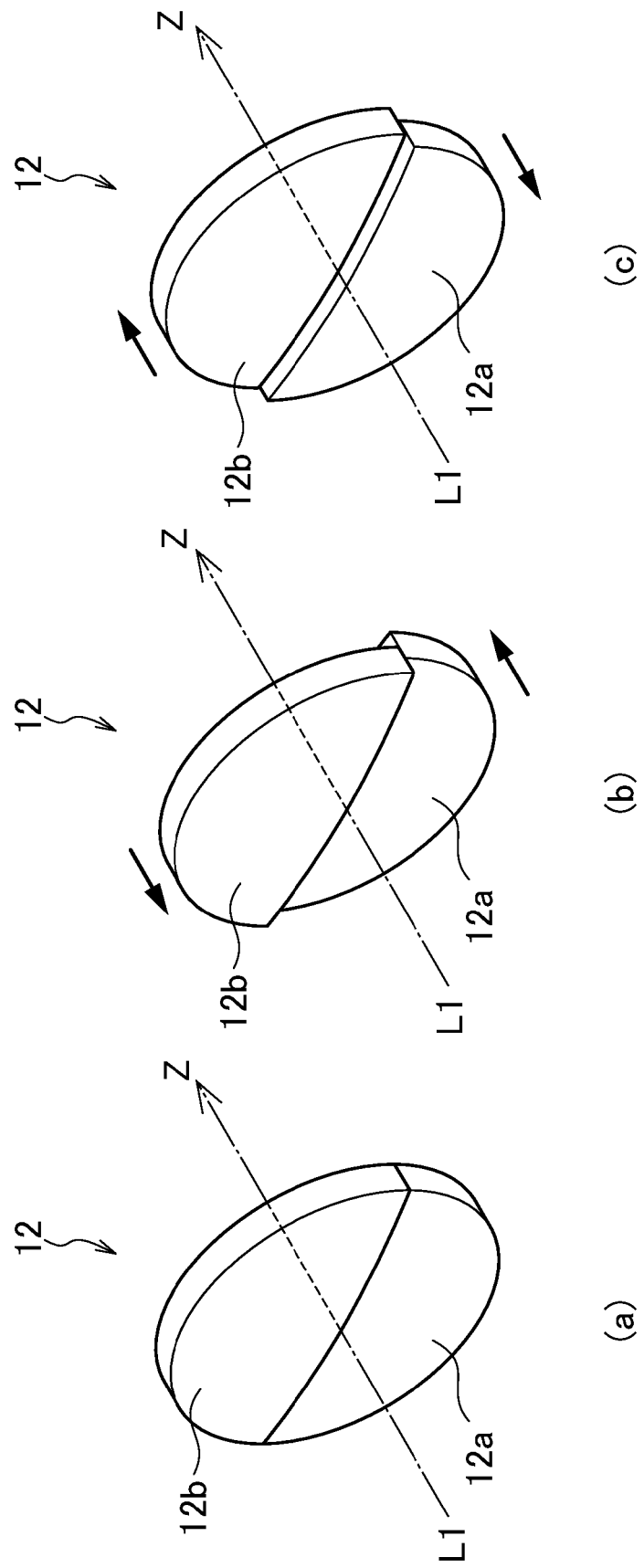
FIG. 4 depicts the state of movement of each region of the taking lens 12.

Also, in the taking lens 12, the far focal region 12a and the near focal region 12b can be individually moved in the optical axis direction to change the focal distance. FIG. 4 depicts the taking lens 12 viewed from a diagonal direction, portion (a) depicting the state in which the far focal region 12a and the near focal region 12b are at the same position in the optical direction, portion (b) depicting the state in which the far focal region 12a is moved to a CCD 16 side and the near focal region 12b is moved to a subject side, and portion (c) depicting the state in which, conversely to portion (b), the far focal region 12a is moved to the subject side and the near focal region 12b is moved to the CCD 16 side. Focal length change by moving the far focal region 12a and the near focal region 12b will be described in detail further below.

Figure 3:
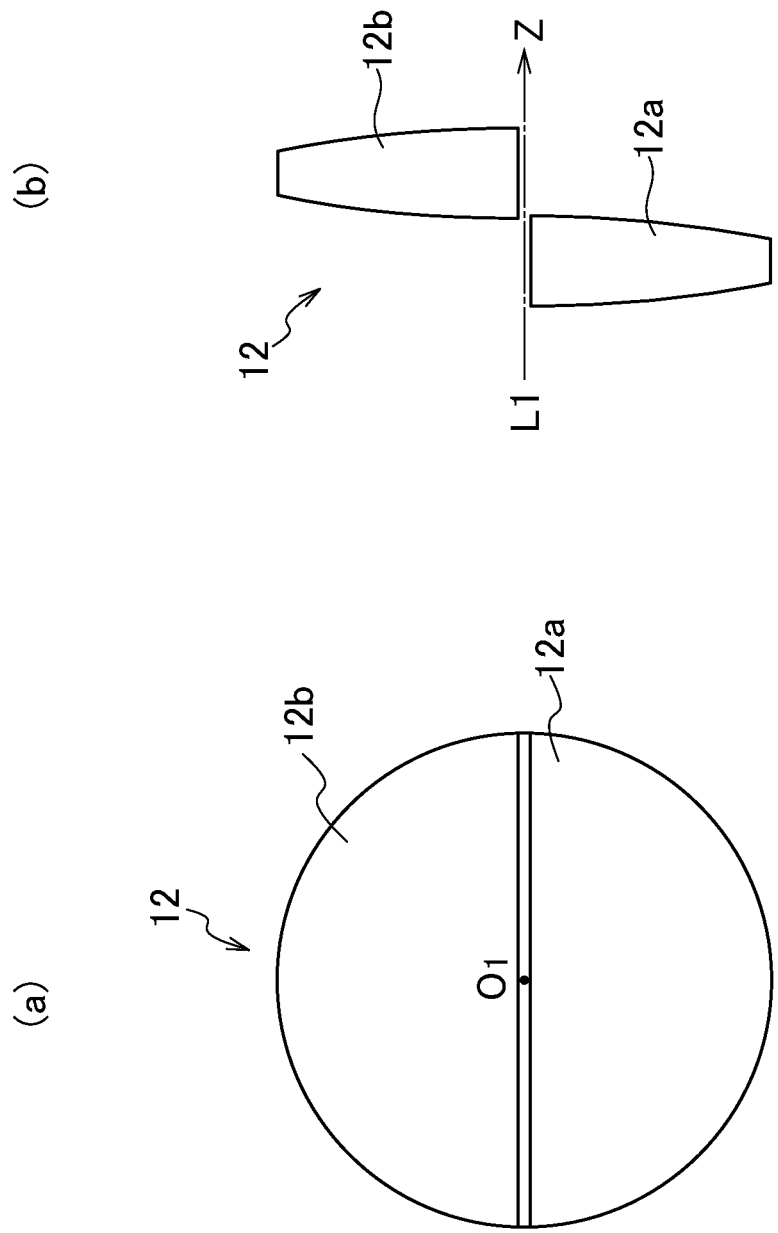
FIG. 3 depicts a front view and a side view of a taking lens 12.

Note that while each focal region is formed in a half-moon shape in the example of FIG. 3, the focal regions may be formed of a circular region and an annular region (either one of these regions is a far focal region and the other is a near focal region). In this case, the taking lens may have a far focal region configured of the annular lens and a near focal region configured of the circular lens separated from the lens for the far focal region, or may have a lens provided with a circular power-zero region inside the annular far focal region and a lens provided with an annular power-zero region outside the circular near focal region. Note that when the focal regions are configured of a circular region and an annular region, the circular shape or the annular shape is preferably formed so that a light-shielding film on a photo sensor corresponds to the shape of the focal region. Also, while the area of the far focal region 12a is equal to the area of the near focal region 12b in the example of FIG. 3, the area ratio between the far focal region and the near focal region may be set at a ratio different from the above according to the characteristic of the optical system, the imaging purpose, the imaging condition, and so on. Also, the number of regions is not restricted to two, but may be three or more.

Figure 5:
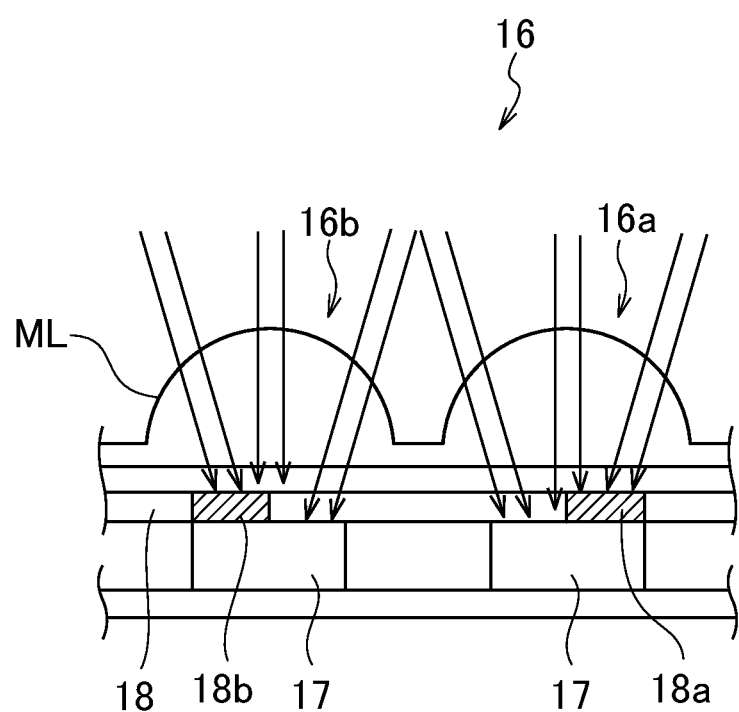
FIG. 5 is a diagram depicting the state of selective light receiving of light beams in an image pickup element 16.

A light beam passing through the far focal region 12a and the near focal region 12b of the taking lens 12 enters each photo sensor of the CCD 16. As depicted in FIG. 5, the CCD 16 has a far-image light-receiving cell 16a which receives a light beam passing through the far focal region 12a of the taking lens 12 and a near-image light-receiving cell 16b which receives a light beam passing through the near focal region 12b. The light-receiving cells 16a and 16b selectively receive a light beam passing through the far focal region 12a and the near focal region 12b by micro lenses ML and light-shielding films 18a and 18b, respectively, provided on the front surface of a light-receiving unit 17. Therefore, the light-shielding films 18a and 18b have different shapes. Note that in place of providing light-shielding films on the front surface of the light-receiving unit 17, a light-shielding member or a liquid-crystal shutter may be provided on the front surface of each micro lens ML.

Figure 6:
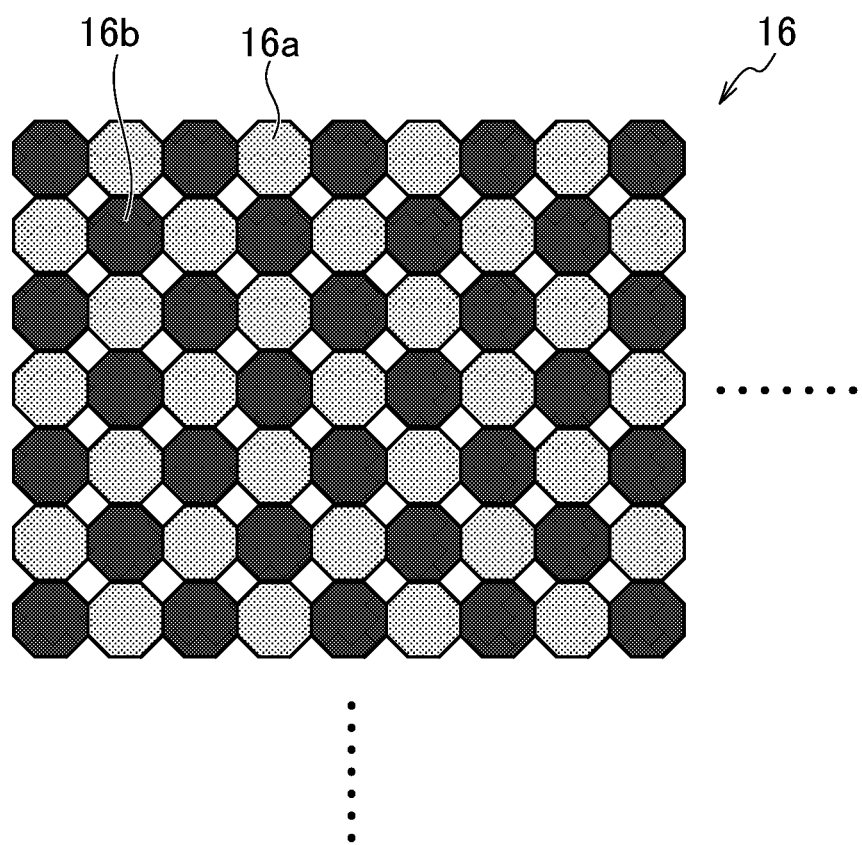
FIG. 6 is a diagram depicting an example of arrangement of light-receiving cells in the image pickup element 16.

A number ratio between the light-receiving cells 16a and 16b is preferably substantially equal to the area ratio between the focal regions 12a and 12b corresponding to the light-receiving cells 16a and 16b. FIG. 6 depicts an example of arrangement of light-receiving cells in the image pickup element 16. In the present embodiment, since the area of the far focal region 12a and the area of the near focal region 12b are equal to each other, the number of light-receiving cells 16a and the number of light-receiving cells 16b are also equal to each other. The light-receiving cells 16a and 16b are preferably arranged so as to prevent degradation of image quality in a specific region or direction in a generated image, and a loss of picture element data due to mixture of cells corresponding to the plurality of focal regions is preferably compensated for by interpolation or the like as appropriate.

The CPU 40 controls the iris 14 via an iris driving unit 34, and also controls a charge accumulation time (shutter speed) at the CCD 16 via a CCD control unit 32, reading of an image signal from the CCD 16, and so on. Signal charges accumulated in the CCD 16 are read as a voltage signal according to a signal charge based on a read signal provided from the CCD control unit 32, and is provided to an analog signal processing unit 20.

The analog signal processing unit 20 samples and holds R, G, and B signals for each picture element by correlated double sampling processing on a voltage signal outputted from the CCD 16, amplifies the signals, and then applies the signals to an A/D converter 21. The A/D converter 21 converts sequentially inputted analog R, G, and B signals to digital R, G, and B signals for output to an image input controller 22. Note that a MOS type image pickup element can be used in place of the CCD 16. In this case, the A/D converter 204 is often incorporated in the image pickup element, and the above-described correlated double sampling is not required.

A digital signal processing unit 24 performs predetermined signal processing such as offset processing, gain control processing including white balance correction and sensitivity correction, gamma correction processing, YC processing, and so on, on the digital image signal inputted via the image input controller 22.

The image data processed at the digital signal processing unit 24 is inputted to a VRAM 50. The VRAM 50 includes an A region and a B region each for storing image data representing an image for one frame. The image data representing an image for one frame is alternately rewritten in the A region and the B region, and the written image data is read from a region other than the region where the image data is rewritten.

The image data read from the VRAM 50 is encoded at a video encoder 28, and is outputted to the liquid-crystal monitor 30. With this, a subject image is displayed on the liquid-crystal monitor 30. For the liquid-crystal monitor 30, a touch panel is adopted, and is displaying the obtained image and allowing a user operation via a screen.

Also, when the release button 38-1 of the operating unit 38 is pressed in the first stage (half press), the CPU 40 starts an AE operation, and performs focal control over the taking lens 12 via the lens driving unit 36. Also, the image data outputted from the A/D converter 21 when the release button 38-1 is pressed halfway is captured into an AE detecting unit 44.

The CPU 40 calculates brightness (imaging Ev value) of the subject from an integrated value of G signals inputted from the AE detecting unit 44, determines an iris value of the iris 14 and an electrical shutter (shutter speed) of the CCD 16 based on this imaging Ev value, and controls a charge accumulation time at the iris 14 and the CCD 16 based on the determination result.

When the AE operation ends and the release button 38-1 is pressed in the second stage (full press), in response to this press, image data corresponding to the far focal region 12a and the near focal region 12b is outputted from the A/D converter 21 and inputted from the image input controller 22 to a memory (SDRAM) 48 for temporary storage.

After temporary storage in the memory 48, through signal processing such as YC processing at the digital signal processing unit 24 and compression processing to a JPEG (joint photographic experts group) format at a compression/decompression processing unit 26, and so on, image files are generated. These image files are read by a media controller 52 and recorded in a memory card 54. Images recorded in the memory card 54 can be replayed and displayed on the liquid-crystal monitor 30 by operating the replay button of the operating unit 38.

<Functional Structure of CPU>

Figure 7:
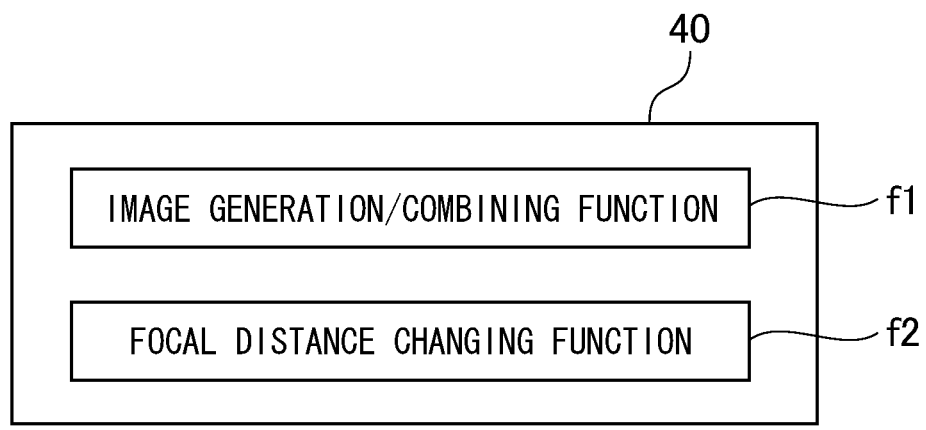
FIG. 7 is a diagram depicting a functional structure of a CPU 40.

As will be described further below, the imaging device 10 performs focal distance control over the taking lens 12 and image generation and combining, and these processes are performed mainly under control of the CPU 40. FIG. 7 is a functional diagram depicting functions of the CPU 40 for performing these processes. As depicted in FIG. 7, the CPU 40 has an image generation/combining function f1 (image generating unit) and a focal distance changing function f2 (focal distance changing unit). General outlines of each function are described below.

The image generation/combining function f1 is a function of generating an image corresponding to the focal distance and the focal length of each region of the taking lens 12 by using an imaging signal outputted from the CCD 16 and also generating an image by combining these images.

The focal distance changing function f2 is a function of changing a focal length of each region of the taking lens 12 by driving a motor included in the lens driving unit 56 or moving an optical signal, which will be described below.

Control based on these functions will be described in detail below. Note that the above-described functions f1 and f2 represent main functions regarding focal distance control, image generation and combining, and so on among the functions of the CPU 40 and the functions of the CPU 40 are not meant to be restricted to these.

<Obtainment of Multi-Focus Images>

Figure 8:
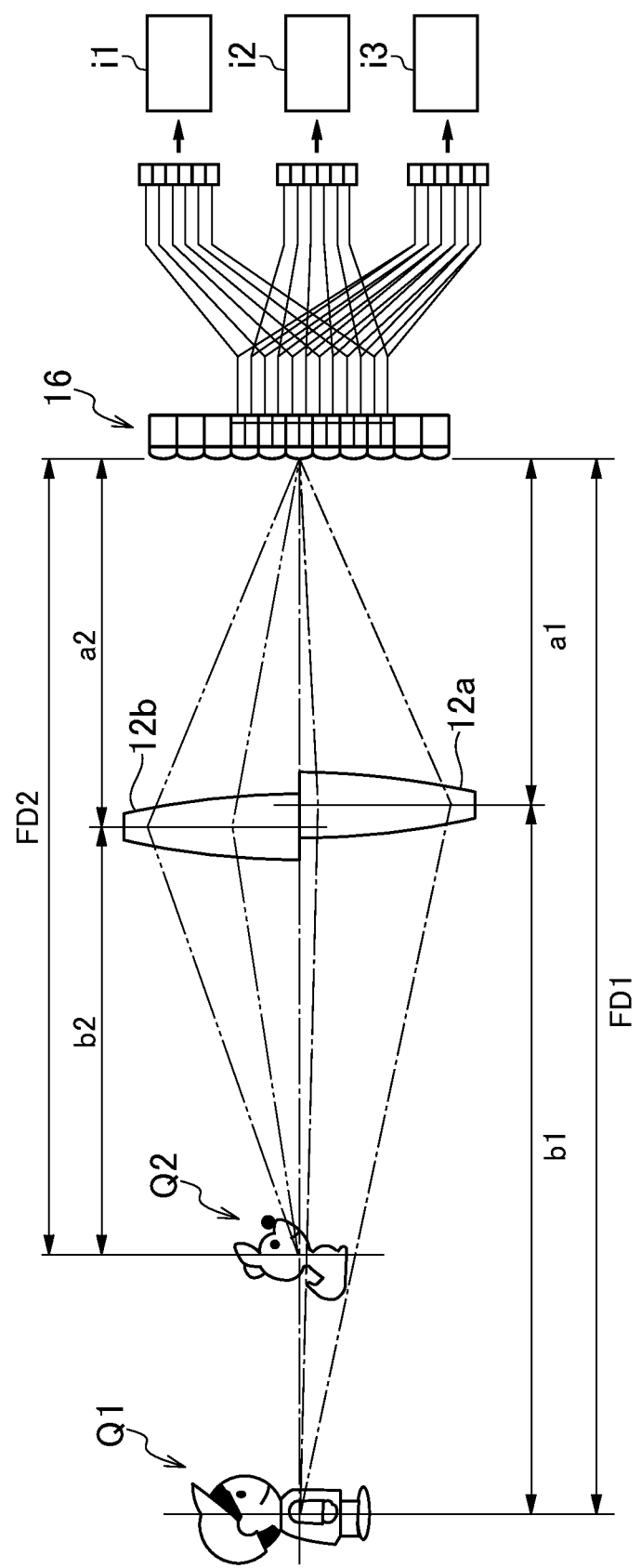
FIG. 8 is a conceptual diagram depicting the state of obtainment of multi-focus images in the imaging device 10.

Next, obtainment of multi-focus images at the imaging device 10 is described. FIG. 8 is a diagram depicting the state of obtainment of focused images at the far focal region 12a and the near focal region 12*b* of the taking lens 12 and an image obtained by combining these images, and reference characters denote as follows.

Reference characters in FIG. 8 denote as follows.

a1, a2: lens-light-receiving plane distances of the far focal region 12*a* and the near focal region 12*b* b1, b2: lens-subject distance of the far focal region 12*a* and the near focal region 12*b*

FD1, FD2: focal distances of the far focal region 12*a* and the near focal region 12*b*

Q1, Q2: subject

Therefore, in the situation of FIG. 8, the subject Q1 at the distance b1 is in focus in the far focal region 12*a*, and the subject Q2 at the distance b2 is in focus in the near focal region 12*b*. FIG. 9 depicts examples of an image obtained in each focal region and an image obtained by extracting a focal portion of each focused image and combining these extracted images, in the situation of FIG. 8. An image i1 depicted in portion (a) of FIG. 9 represents an image obtained in far focal region 12*a*, where the subject Q1 at the distance b1 is in focus and the subject Q2 at the distance b2 different from the distance b1 is blurred according to a difference between the distances b1 and b2. On the other hand, an image i2 depicted in portion (b) of FIG. 9 represents an image obtained in the near focal region 12*b*, where the subject at the distance b2 is in focus and the subject Q1 at the distance b1 different from the distance b2 is burred according to the difference between the distances b2 and b1. When focal portions of these images i1 and i2 are extracted and combined together, an image with both of the subjects Q1 and Q2 in focus can be obtained, as an image i3 depicted in portion (c) of FIG. 9.

Note that while an image with one subject burred is depicted as an example in FIG. 9, even if a subject is at a distance different from the distances b1 and b2 but is within the depth of fields of the respective focal regions 12*a* and 12*b*, the subject is regarded as "in focus". For example, when the subject Q1 is within the depth of fields of the near focal region 12*b*, the subject Q1 is in focus in the image i2 corresponding to the near focal region 12*b*, and the image i2 is an image where the subjects Q1 and Q2 are both in focus. The same goes for the subject Q2. The depth of field of each of the focal regions 12*a* and 12*b* can be set in consideration of these circumstances.

<Effect of Multi-Focus Imaging>

As such, in the imaging device 10 according to the first embodiment, a plurality of images with different focal distances can be simultaneously obtained by using the far focal region 12*a* and the near focal region 12*b*. Also, since the image pickup element 16 includes light-receiving cells 16*a* and 16*b* which selectively receive a light beam passing through the far focal region 12*a* and near focal region 12*b*, respectively, it is possible to prevent imaging signals with different focal lengths from being mixed to degrade image quality. That is, a desired image can be quickly and easily obtained while favorable image quality is ensured.

<Focal Distance Change>

Figure 10:
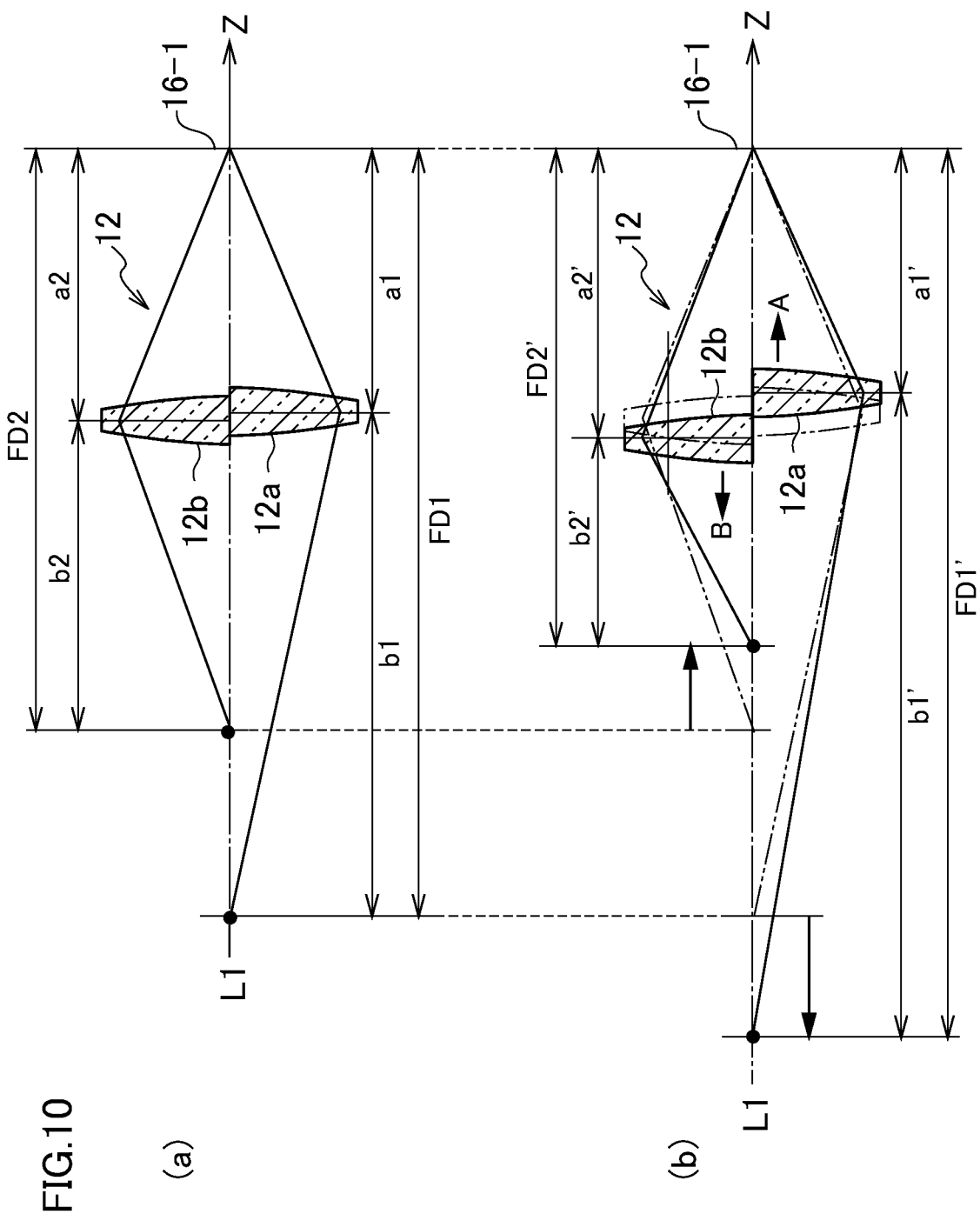
FIG. 10 depicts a multi-focus distance change in the imaging device 10.

Next, a focal distance change in the present embodiment is described. FIG. 10 depicts views of the taking lens 12 when viewed from a side surface. A right side of the drawing represents the direction of the CCD 16, and a reference character 16-1 denotes a light-receiving plane of the light-receiving cells 16*a* and 16*b*. Portion (a) of FIG. 10 represents the state in which the far focal region 12*a* and the near focal region 12*b* are at the same position in the optical axis (L1) direction. In this state, a focal distance FD1 of the far focal region 12*a* is FD1=a1+b1, and a focal distance FD2 of the near focal region 12*b* is FD2=a2+b2. Here, as described above, the focal length f and the distance a (distance between the taking lens and the light-receiving plane of the light-receiving sensor) and the distance b (distance between the lens and the focal distance) has a relation of (1/f)=(1/a)+(1/b). When the far focal region 12*a* is moved in an arrow A direction (a subject side) as in portion (b) of FIG. 10, the distance a1 becomes long (a1'), the distance b1 becomes short (b1'), and the focal distance FD1 becomes short (FD1'). Similarly, when the near focal region 12*b* is moved in an arrow B direction (a light-receiving plane side), the distance a2 becomes short (a2'), the distance b2 becomes long (b2'), and the focal distance FD2 becomes long (FD2').

Examples of numerical values in focal distance change are described. For example, when the distance a1 of the far focal region 12*a* is 10 cm and the distance b1 is 3 m (therefore, the focal distance is 3.1 m and the focal length is approximately 97 mm), if the far focal region 12*a* is moved to a light-receiving plane 16-1 side and the distance a1' is 9.9 cm, the distance b1' is approximately 4.3 m, and the focal distance is approximately 4.4 m.

This focal distance change may be performed by user manual operation (for example, a lens barrel is rotated to move the taking lens 12 via a cam mechanism in the optical axis direction), or may be performed by the lens driving unit 56 moving the far focal region 12*a* and the near focal region 12*b* in the optical axis direction based on a user instruction input via the operating unit 38. The taking lens 12 may be moved by the lens driving unit 56 by using, in addition to a motor, a cam, a gear, a PZT (piezo-element), or the like.

As such, by moving the far focal region 12*a* and the near focal region 12*b* to change the focal distance, a plurality of images can be simultaneously obtained with a desired focal distance and its combination.

<Other Modes of Focal Distance Change>

While the case has been described in the above-described embodiment in which the far focal region 12*a* and the near focal region 12*b* are moved in the optical axis direction, the structure of the multi-focus lens and focal distance change in the present invention are not restricted to the above-described mode. Other modes are described below.

(1) When a Change is Made by Movement of Circular Lenses

FIG. 11 depicts an example when the taking lens 12 is configured to include two circular lenses and one or both of these circular lenses are moved in the optical axis direction to change the focal distance. By using these circular lenses, the lenses can be held and moved more easily than half-moon-shaped lenses as described above. In portion (a) of FIG. 11, a lens 12-1 has a lower region D0 without power (flat surface) and an upper region D1 with positive power (convex surface), and a lens 12-2 has an upper region D2 without power (flat surface) and a lower region D3 with positive power (convex surface). On the other hand, in portion (b) of FIG. 11, a lens 12-1' has a lower region D0' without power (flat surface) and an upper region DF with positive power (convex surface), and a lens 12-2' has an upper region D2' with negative power (concave surface) and a lower region D3' without power (flat surface). When lenses as depicted in portion (b) of FIG. 11 are used, these lenses and a main lens are combined together to form an image forming lens (taking lens 12).

(2) When a Change is Made by Rotation of Half-Moon-Shaped Lenses

FIG. 12 depicts an example when two half-moon-shaped lenses 12-3 and 12-4 are arranged in the optical axis direction and one of the lenses is rotated to change the focal distance. In FIG. 12, portions (a1) to (a3) are diagrams of the half-moon-shaped lenses 12-3 and 12-4 viewed from diagonally above with respect to the optical axis direction. In FIG. 12, portion (a1) depicts the state in which the half-moon-shaped lenses 12-3 and 12-4 are superposed each other, portion (a2) depicts the state in which the half-moon-shaped lens 12-4 is rotated by ¼, and portion (a3) depicts the state in which the half-moon-shaped lens 12-4 is rotated by ¼. When portions (a1) to (a3) are viewed from a subject side, views are as portions (b1) to (b3) and (c1) to (c3).

In the above-described state, the power of the entire lens is as portions (c1) to (c3), and each of the plurality of regions has individual power (focal distance). When power of the half-moon-shaped lenses 12-3 and 12-4 are taken as D1 and D2, respectively, power of an upper half (first and second quadrants) is D1+D2 and power of a lower half (third and fourth quadrants) is zero in portion (c1), power of the first to fourth quadrants are (D1+D2), D1, zero, and D2, respectively in portion (c2), and power of the upper half (first and second quadrants) is D1 and power of the lower half (third and fourth quadrants) is D2 in portion (c3).

Figure 13:
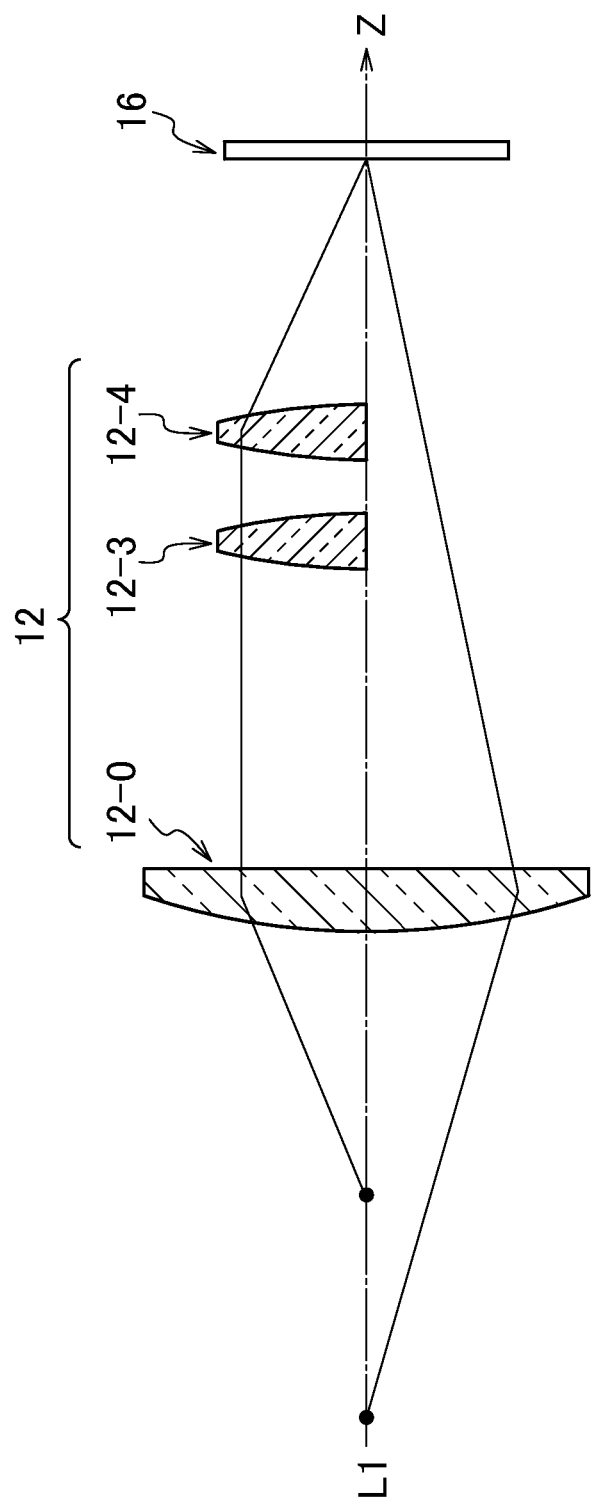
FIG. 13 is a diagram depicting a mode in which the taking lens 12 is configured by using half-moon-shaped lenses.

When lenses as in FIG. 12 is used, these lenses and a main lens 12-0 are combined together to form an image forming lens (taking lens 12) (refer to FIG. 13).

Note that when the lenses are rotated as in (2) described above, as with the case of (1) (FIG. 11), circular lenses may be used. For example, in a lens system of FIGS. 12 and 13, with the lenses 12-3 and 12-4 each formed in a circular shape and one or both of these lenses being rotated, the lenses can be easily held and moved as with the case of FIG. 11.

(3) When a Change is Made by Movement of an Optical Member

Figure 14:
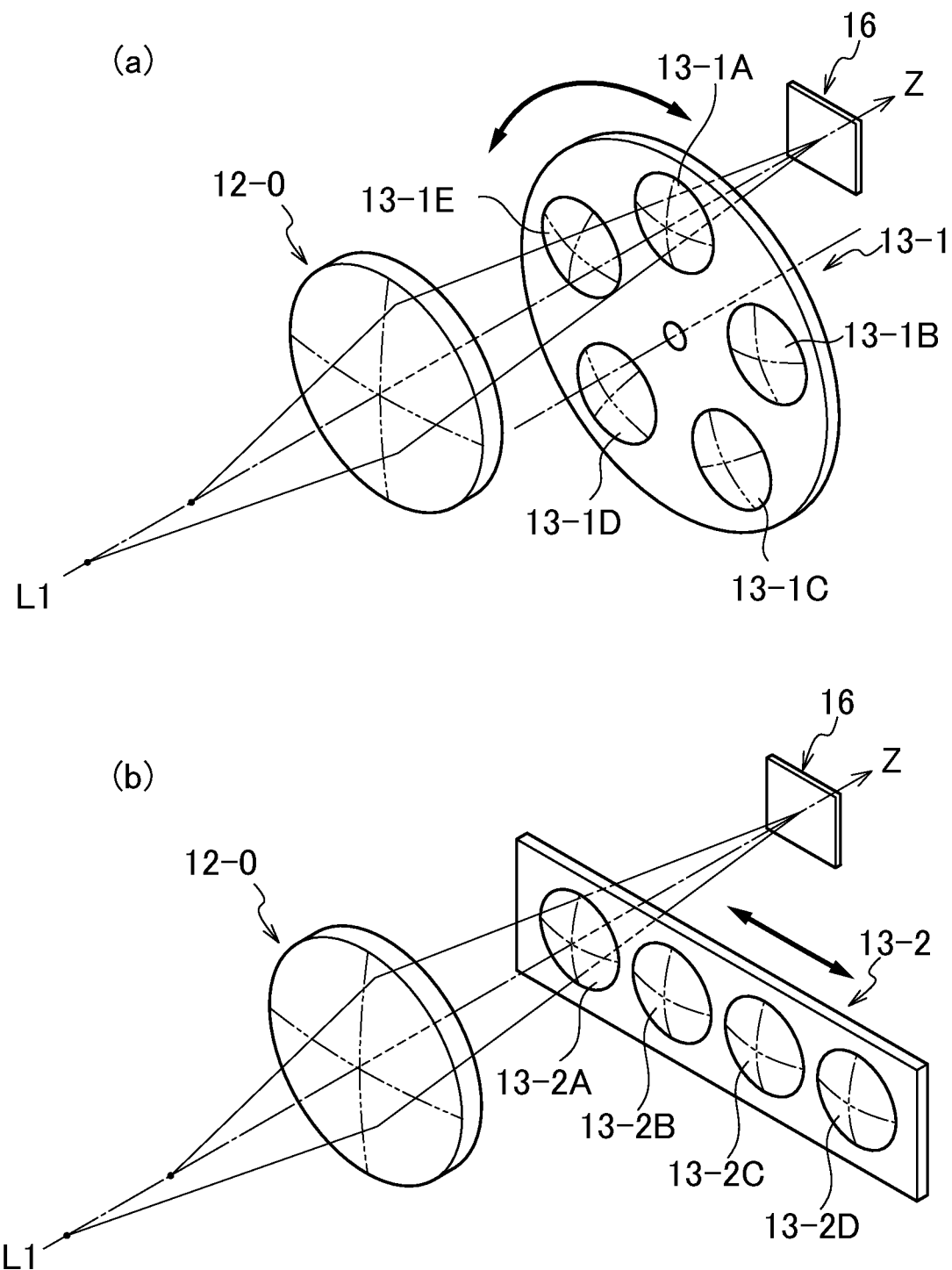
FIG. 14 depicts the state of a multi-focus distance change by movement of an optical member.

The focal distance can be changed by moving an optical member (rotation movement, translation movement). FIG. 14 depicts examples of a focal distance change by these schemes, and portion (a) depicts the case of rotation movement of an optical member 13-1 (optical member) and portion (b) depicts the case of translation movement of an optical member 13-2 (optical member). In the optical member 13-1 depicted in portion (a) of FIG. 14, lenses 13-1A to 13-1E are circumferentially disposed, and this optical member 13-1 is rotated to position any of the lenses 13-1A to 13-1E on the optical axis of the main lens 12-0, thereby allowing the focal distance of the lens system as a whole to be changed. Also, in the rectangular optical member 13-2 depicted in portion (b) of FIG. 14, lenses 13-2A to 13-2D are linearly disposed, and this optical member 13-2 is moved in a translation manner to position any of the lenses 13-2A to 13-2D on the optical axis of the main lens 12-0, thereby allowing the focal distance of the lens system as a whole to be changed. In these optical members, the focal distance, the focal length, and the number of lenses may be set according to a desired range of the focal distance of the lens system as a whole.

<Second Embodiment>
<Automatic Change of Focal Distance Based on Distance Distribution>

Next, a second embodiment of the imaging device according to the present invention is described. While the focal distance is changed based on the user operation or instruction input in the first embodiment described above, the case is described in the second embodiment in which the focal distance is automatically changed based on a distribution of a subject distance.

Figure 15:
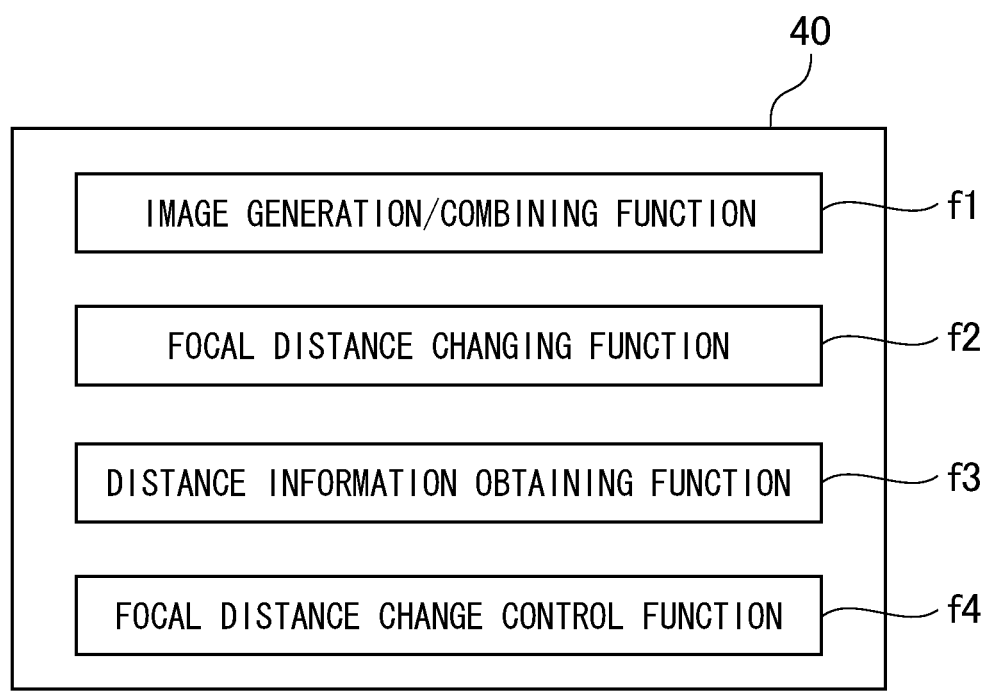
FIG. 15 is a diagram depicting a functional structure of the CPU 40 in an imaging device according to a second embodiment.

Also in the second embodiment, the basic structure of the imaging device is similar to that of the first embodiment, and therefore differences are described below. FIG. 15 is a diagram of a functional structure of a CPU in the second embodiment. In the second embodiment, the CPU 40 has the following functions f1 to f4.

As with the first embodiment, the image generation/combining function f1 is a function of generating images each corresponding to the focal distance and the focal length in each region of the taking lens 12 by using imaging signals outputted from the CCD 16 and generating an image obtained by combining these images.

The focal distance changing function f2 is a function of changing the focal distance by driving a motor or the like included in the lens driving unit 56 to move the taking lens 12. Note that also in the second embodiment, as with the first embodiment, the focal distance can be changed by moving the taking lens 12 and moving the optical member (refer to FIGS. 10 to 14).

A distance information obtaining function f3 (distance information obtaining unit) is a function of obtaining a distance distribution of the subject based on a signal outputted from the CCD 16 (distance information obtaining unit). Note that in the distance information obtaining function f3, subject distance information can be detected by various methods. For example, as described in Japanese Patent Application Laid-Open No. 2011-124712, a phase difference detection picture element may be provided to the image pickup element and a distribution may be calculated by using phase difference information. Alternatively, a distribution may be calculated by comparing contrasts of a plurality of imaging signals obtained at different lens positions.

A focal distance changing control function f4 (focal distance change control unit) is a function of controlling the focal distance change by the focal distance changing function f2 based on distance information obtained by the distance information obtaining function f3. Furthermore, the focal distance changing control function f4 has a focal distance determining function f4-1, a far focal region 12a target position determining function f4-2, and near focal region 12b target position determining function f4-3.

Figure 16:
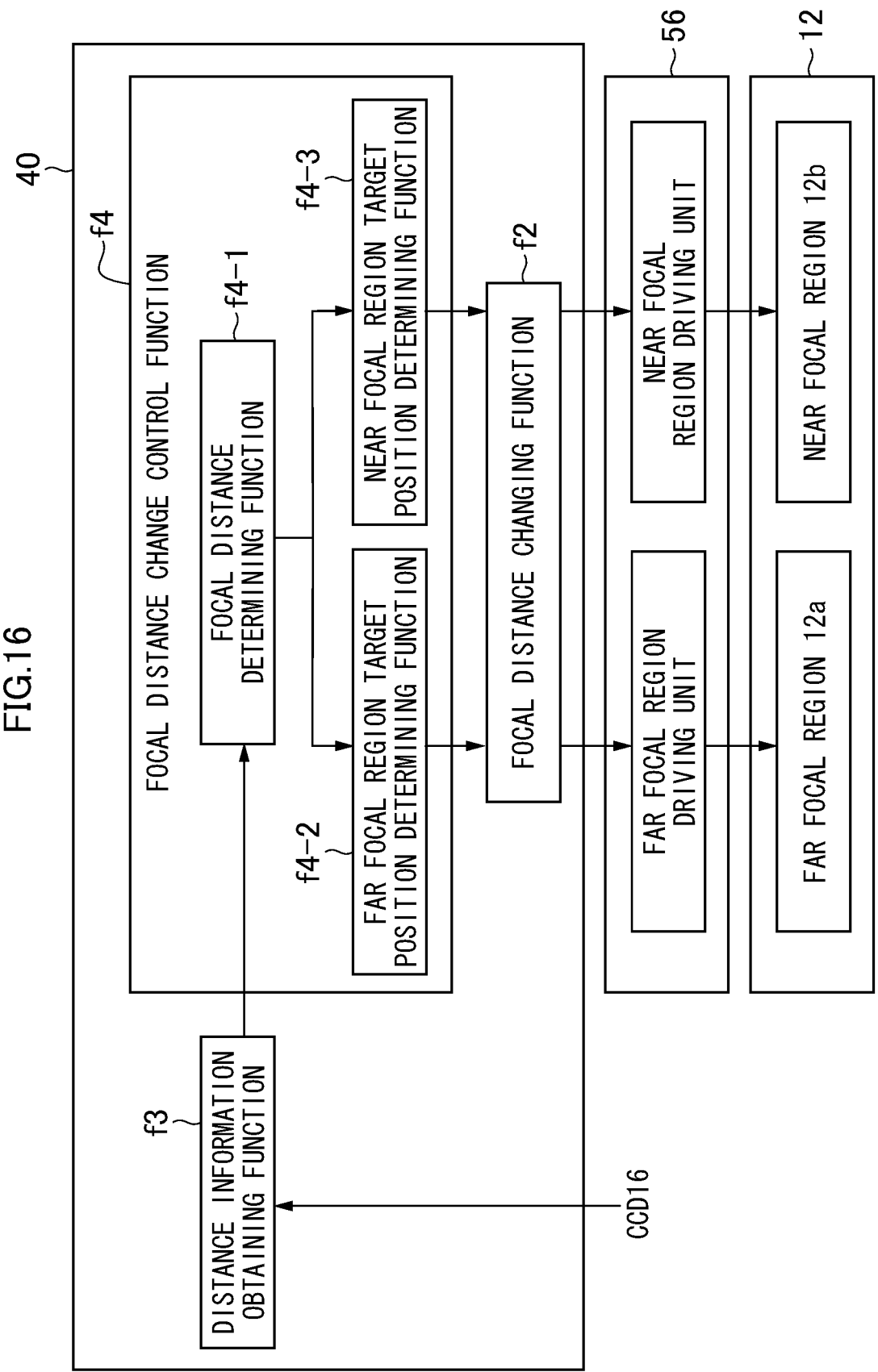
FIG. 16 is a diagram depicting a relation among the functions of the CPU 40, a lens driving unit 56, and the taking lens 12 in the second embodiment.

FIG. 16 is a diagram depicting a relation among the functions of the above-described CPU 40, the lens driving unit 56, and the taking lens 12.

Figure 17:
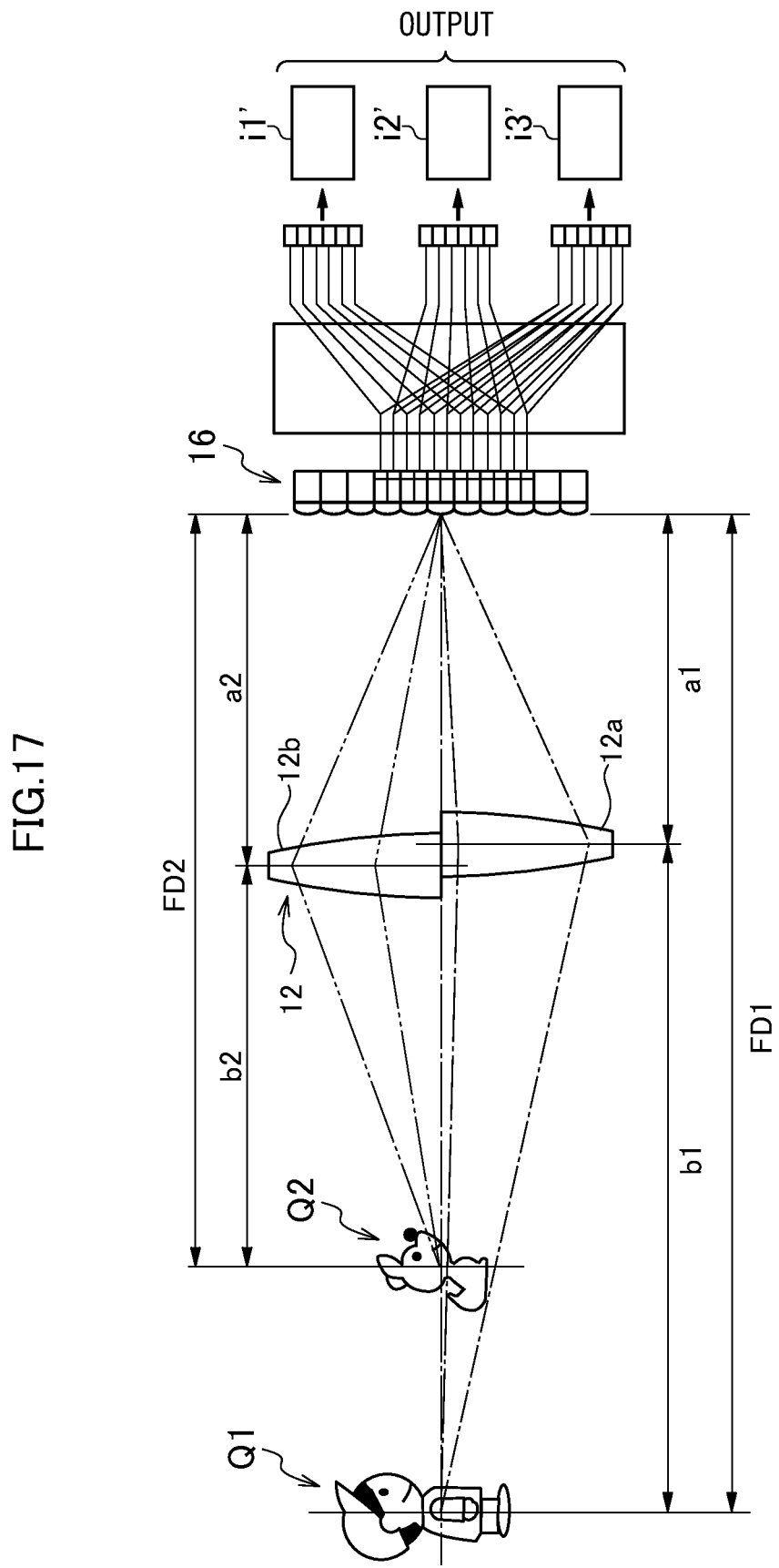
FIG. 17 is a conceptual diagram depicting the state of image obtainment in when the taking lens 12 has regions with different focal distances in the second embodiment.

In the above-structured second embodiment, a distance distribution of the subject is obtained by the above-described distance information obtaining function f3. As a result, when the plurality of subjects Q1 and Q2 are positioned at different distances (lens-subject distances) b1 and b2 as in an example of FIG. 17, the focal distance changing control function f4 and the focal distance changing function f2 control the lens driving unit 56 to set the focal distance of the far focal region 12a at FD1(=a1+b1) and the focal distance of the near focal region 12b at FD2(=a2+b2). Then, correspondingly, images i1' and i2' and an image i3' obtained by combining these images corresponding to the far focal region 12a and the near focal region 12b are outputted. The state of the images i1' to i3' are similar to i1' to i3' in the first embodiment (refer to FIG. 9).

Figure 18:
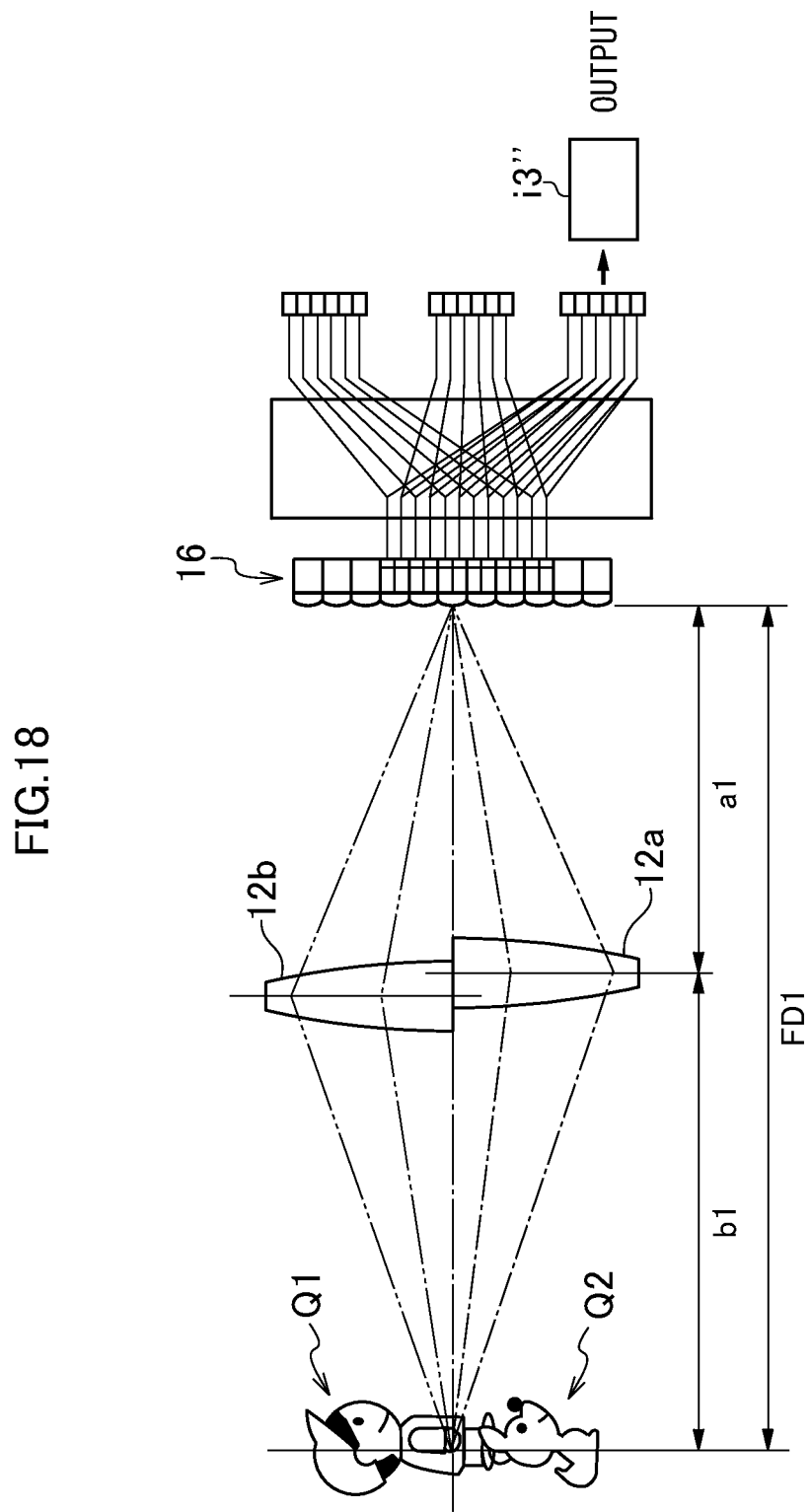
FIG. 18 is a conceptual diagram depicting the state of image obtainment in when the taking lens 12 has regions with a same focal distance in the second embodiment.

On the other hand, as a result of obtainment of the distance distribution of the subject, when the plurality of subjects Q1 and Q2 are positioned at the equal distance (lens-subject distance) b1 as in an example of FIG. 18, the focal distance changing control function f4 controls the lens driving unit 56 to set the focal distances of the far focal region 12a and the near focal region 12b both at FD1(=a1+b1). Then, in this case, by using imaging signals from both of the light-receiving sensors 16a and 16b corresponding to the far focal region 12a and the near focal region 12b, an image i3" with high resolution and light amount and favorable image quality can be generated. Note that the "equal" distance is not restricted to a completely equal distance and may include the case of a slight difference (which may vary depending on the type of the subjects and the imaging purpose). Also, for example, when a plurality of subjects is present in a depth of field of either one of the focal regions, these subjects may be regarded as being at an "equal" distance.

<Third Embodiment>

Next, a third embodiment of the imaging device according to the present invention is described. While the cases have been described in the first and second embodiments described above in which the focal distances of the respective regions of the taking lens are different from each other and the focal distance is changed, the cases are described in the third embodiment in which the focal distances of the respective regions of the taking lens are equal to each other and the focal length is changed.

Since the imaging device according to the third embodiment is basically similar to those of the first and second embodiments (refer to FIG. 2), differences are described below.

Figure 19:
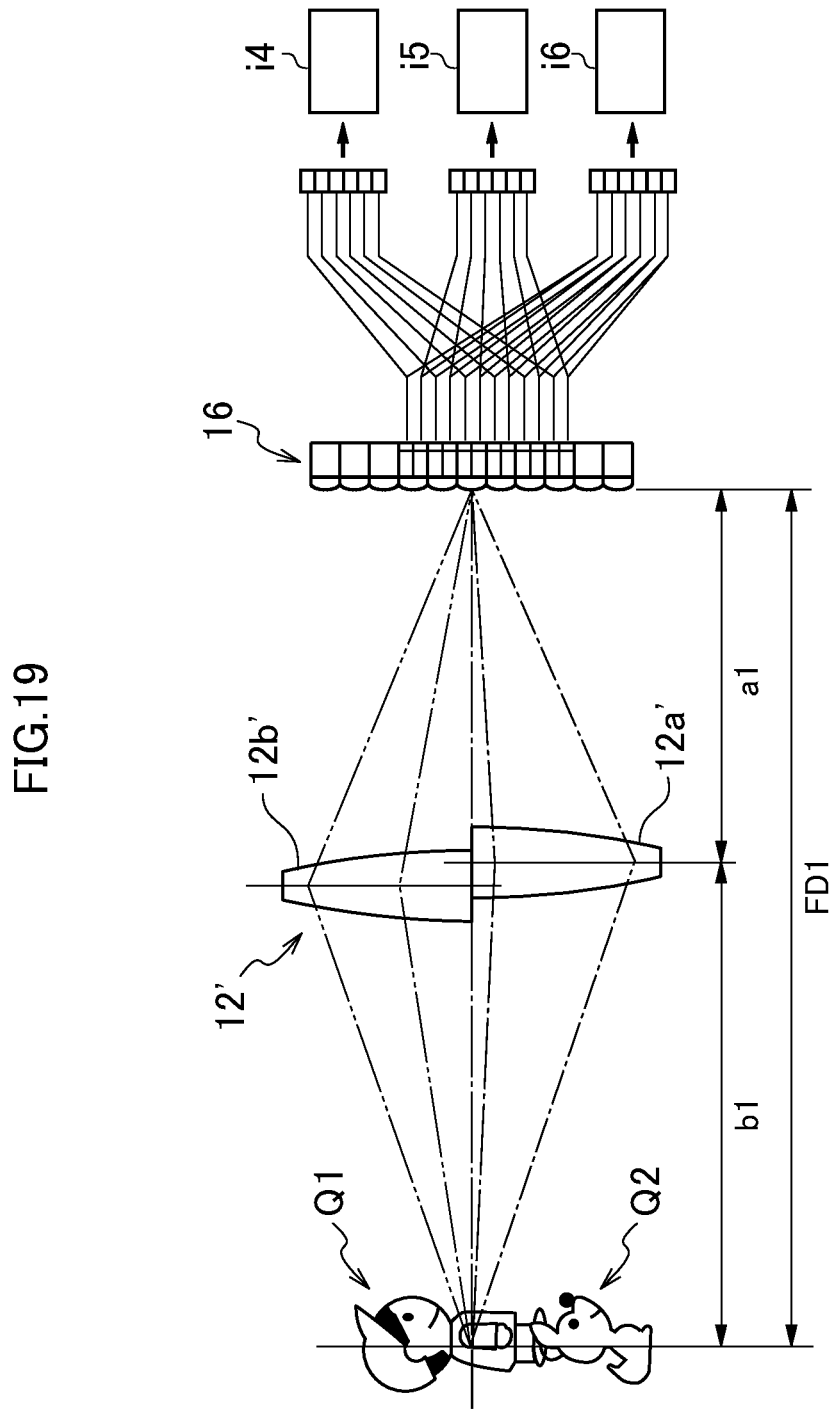
FIG. 19 is a conceptual diagram depicting image obtainment in a third embodiment.

A taking lens 12' in the imaging device according to the third embodiment has a first region 12a' and a second region 12b', and these regions are at an equal focal distance and with different focal lengths (image magnifications). And, these two focal regions act as two lenses physically separated from each other to configure the taking lens 12 as a whole. With this taking lens 12', in the imaging device according to the third embodiment, a plurality of images i4 and i5 with different focal length (image magnifications) corresponding to the first region 12a' and the second region 12b' can be simultaneously obtained as depicted in FIG. 19.

Figure 20:
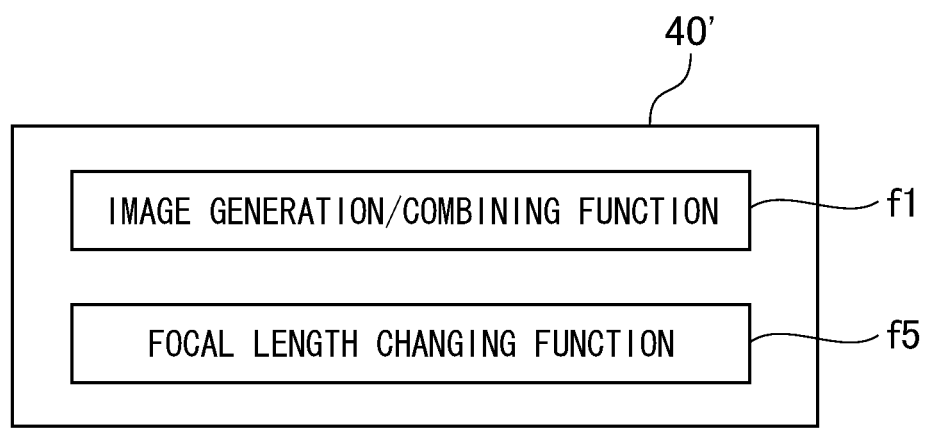
FIG. 20 is a diagram depicting a functional structure of a CPU 40' in the third embodiment.

FIG. 20 is a diagram of a functional structure of a CPU 40' in the imaging device according to the third embodiment. In addition to the image generation/combining function f1 similar to that of the first and second embodiments, the CPU 40' mainly has a focal length changing function f5 (focal length changing unit) of changing the focal length by moving each region of the taking lens.

Figure 21:
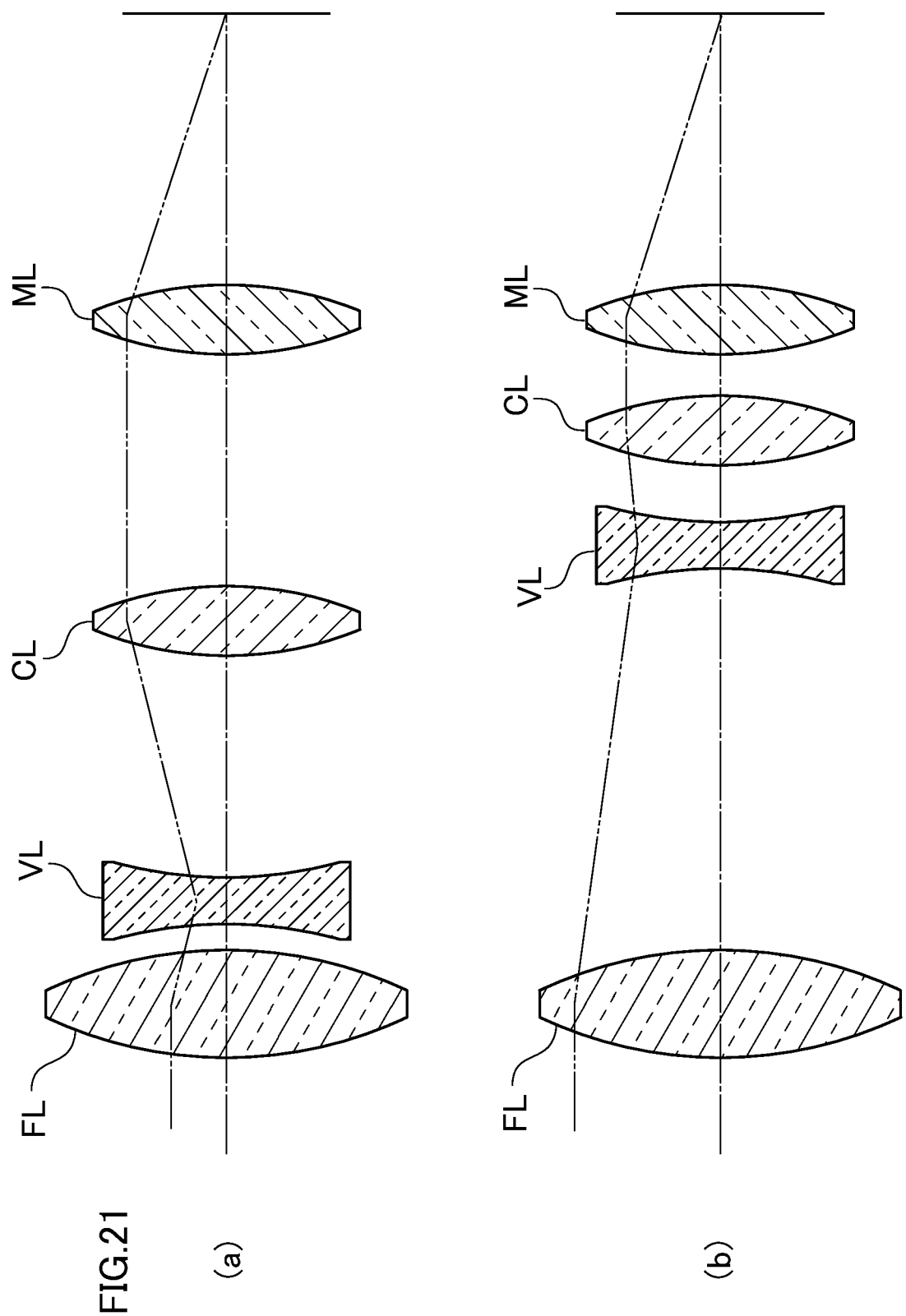
FIG. 21 describes a mechanism of a focal length change.

FIG. 21 describes a mechanism of a focal length change. While various mechanisms for changing the focal length can be thought, the structure of the zoom lens is used in the third embodiment. While various types of zoom lens are present, a "4-group" type is exemplarily described herein, where a lens to be driven is positioned at the center of a lens group.

In the example of FIG. 21, the lens structure is divided into groups (components) of, from the front, a "focal-system lens (focusing lens: a convex component) FL", a "variable-power-system lens (variator: a concave component) VL", a "correction-system lens (compensator: a convex component) CL", and an "image-forming-system lens (master lens and also referred to as a relay system: a convex component) ML". The first to third groups practically functioning zoom lenses are of a non-focal (afocal) system where no focus is established, and the focal length is changed by changing an afocal magnification (a ratio between the height of parallel light entering the first group from the optical axis and the height thereof exiting the third group from the optical axis).

A numerical value obtained by multiplying the afocal magnification by the focal length of the convex-component master lens ML of the fourth group is a focal length of the zoom lens as a whole. For example, when the focal length of the master lens ML is 150 mm and the afocal magnifications of the first to third groups are 0.5 ((a) portion of FIG. 21) to 1 ((b) portion of FIG. 21), the focal length of the zoom lens as whole is 75 mm to 150 mm.

Figure 22:
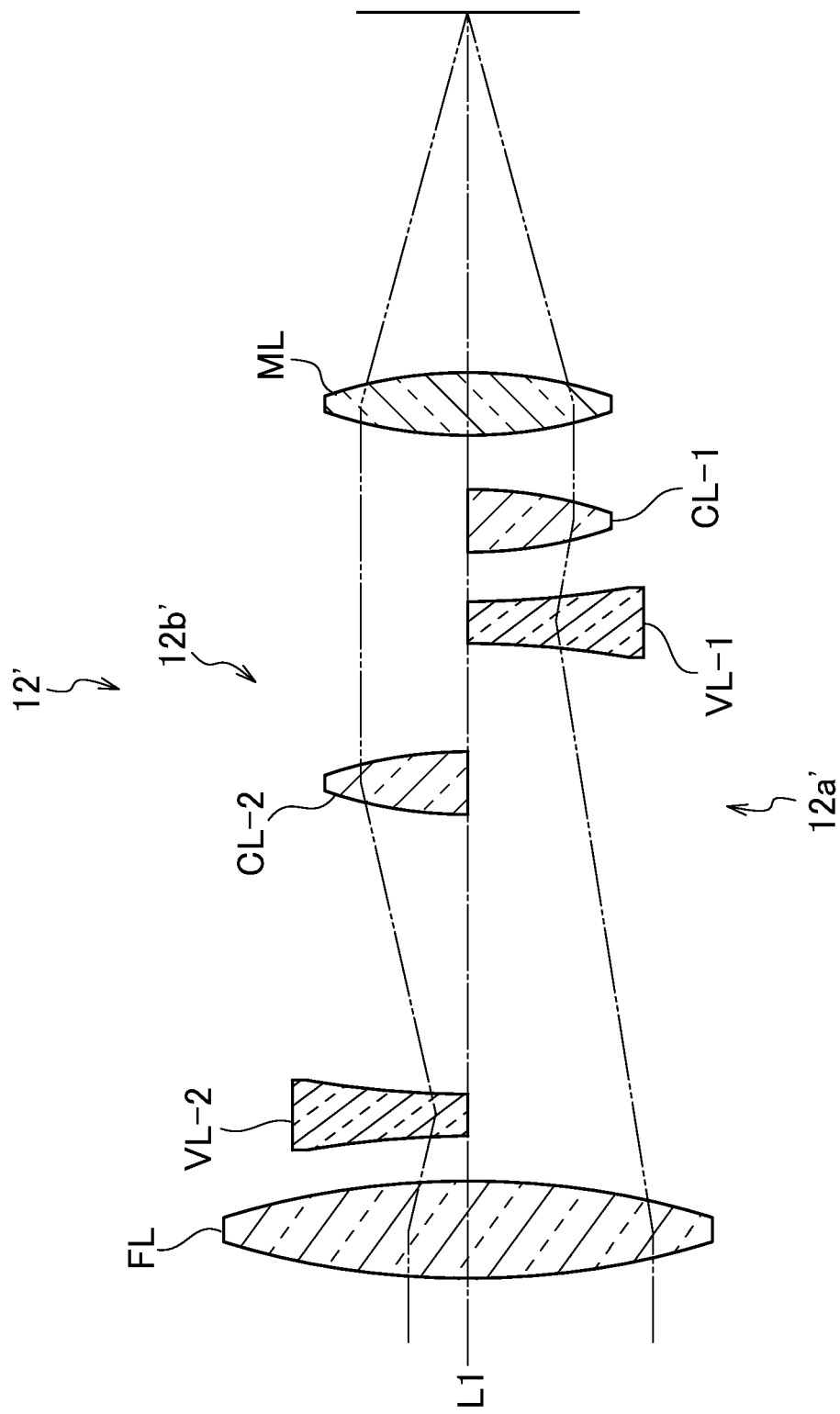
FIG. 22 is a diagram depicting a mode of a focal length change in the third embodiment.

In the taking lens 12' in the third embodiment, as depicted in FIG. 22, the variable-magnification-system lens VL of the second group and the correction-system lens CL of the third group are taken as multi-focus lenses. By moving these lenses, the lens focal length can be changed as a whole. A lower portion of FIG. 22 represents the first region 12a' with a long focal length, and an upper portion thereof represents the second region 12b' with a short focal length. The lens may be moved by user manual operation (for example, a lens barrel is rotated to move the lens via a cam mechanism), or may be performed by the lens driving unit 56 based on a user instruction input via the operating unit 38.

Note that, also in the third embodiment, as with the second embodiment (refer to FIG. 14), the focal length may be changed by moving (rotation movement, translational movement) an optical member having a plurality of lenses at different focal distances or with different focal distances arranged thereon.

FIG. 23 depicts examples of an image obtained by the imaging device including this taking lens 12'. In FIG. 23, portion (a) depicts a telescopic image i4 obtained in the first region 12a' with a long focal length, portion (b) depicts a wide-angle image i5 obtained in the first region 12b' with a short focal length. When these images are used, an imaging signal of the image i5 is used for a peripheral portion of the imaging range, and imaging signals of both of the images i4 and i5 are used for a telescope portion (a portion indicated by a dotted line CA in portion (b) of FIG. 23) for image combination. With this, an image i6 with improved resolution and light amount for the telescope portion (the portion indicated by a dotted line CA in portion (c) of FIG. 23) can be obtained. In the image i6, while image quality is ensured to some extent for a subject other than a desired subject on the perimeter of the imaging range (in this case, the subject Q2), the image quality of the desired subject at the center of the imaging range (in this case, a face portion of the subject Q1) can be improved.

<Fourth Embodiment>

Next, a fourth embodiment of the imaging device according to the present invention is described. While the case in which the taking lens is formed of two or more lenses physically separated from each other is described in the above-described first to third embodiments, the case in which the taking lens is formed of one lens with a plurality of lens units integrated together is described in the fourth embodiment.

Figure 24:
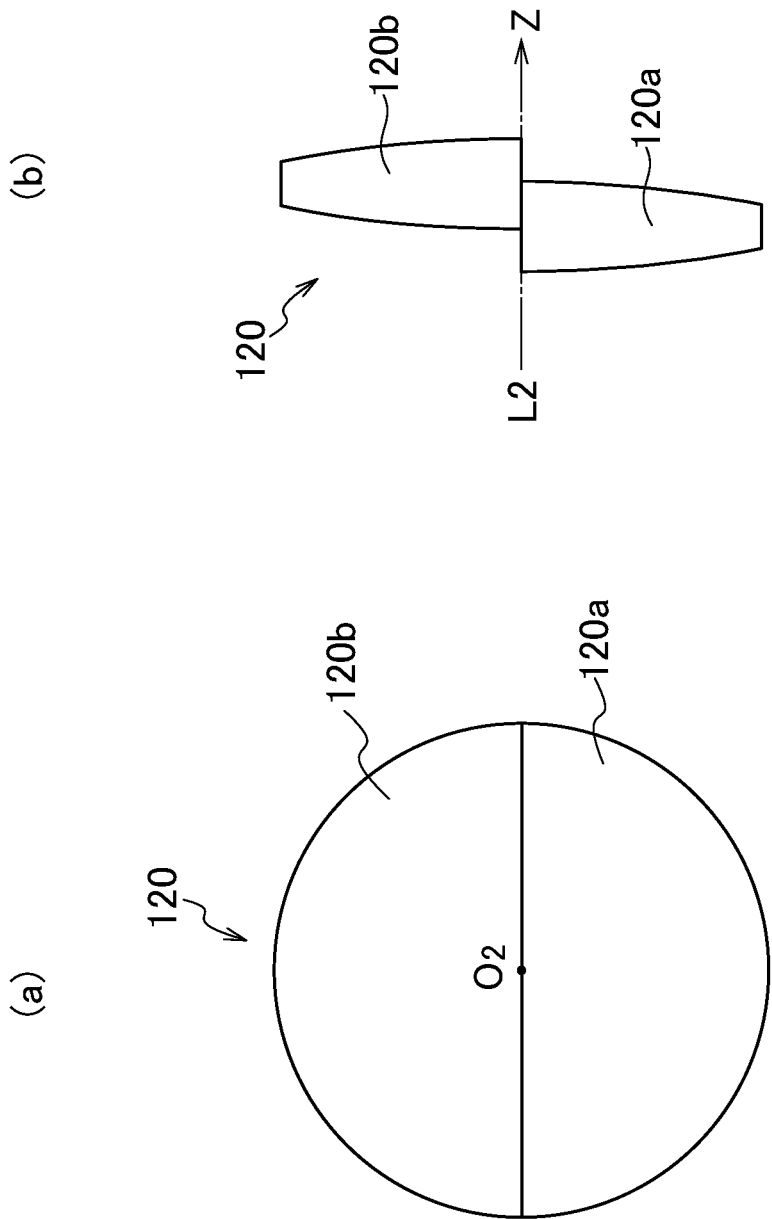
FIG. 24 depicts an example of a taking lens in a fourth embodiment.

FIG. 24 depicts an example of a taking lens 120 according to the fourth embodiment. As depicted in portion (a) of FIG. 24, the taking lens 120 is provided with regions each in a half-moon shape when viewed from the front above and below a lens center O2 (above and below an optical axis L2), and are a far focal region 120a and a near focal region 120b in the order from the lower portion. Also as depicted in portion (b) of FIG. 24, the far focal region 120a and the near focal region 120b are arranged with their positions in the optical axis direction shifted. These focal regions are integrally coupled to configure the taking lens 120 as one lens. Here, since the far focal region 120a and the near focal region 120b have an equal focal length but are arranged with their positions in the optical axis direction shifted, the far focal region 120a and the near focal region 120b have different focal distances. Note herein that "an approximately equal focal length" is not restricted to a completely equal focal length, but can also include the case in which the focal length varies to the extent to which the user visually recognizing an image cannot clearly understand a difference in image magnification of the same subject. Also, the positions of the respective focal regions in the optical axis direction may be set so that a desired focal length can be obtained.

In the fourth embodiment, the imaging device has other structures similar to those of the first to third embodiments, and includes, for example, a CCD (image pickup element)

having a plurality of light-receiving sensors each which selectively receives a light beam passing through any of the above-described focal regions. Also, in the imaging device according to the fourth embodiment, images corresponding to the respective focal regions and an image obtained by combining these images can be generated from imaging signals outputted from the CCD.

With this structure, in the imaging device according to the fourth embodiment, a plurality of images with different focal distances can be simultaneously obtained with favorable image quality.

Note that, also in the imaging device according to the fourth embodiment, as with the first to third embodiments, the focal distance may be changed by moving the taking lens 120 in the optical axis direction.

While the present invention has been described by using the first to fourth embodiments, modes for carrying out the present invention are not restricted to these embodiments, and can be variously modified in a range not deviating from the spirit of the present invention.

What is claimed is:

1. An imaging device comprising:
   a taking lens formed of two or more physically separated lenses and having a plurality of regions each having an individual focal distance corresponding to a combination of the two or more lenses;
   an image pickup element having a plurality of light-receiving sensors two-dimensionally arranged to correspond to the plurality of regions, the plurality of light-receiving sensors two-dimensionally arranged so as to configure a sensor group for each corresponding region that have imaging angles of views which substantially coincide with each other; and
   an image generating unit which generates an image of a subject from an imaging signal outputted from the image pickup element, wherein
   regardless of a position in the two-dimensional arrangement of the light-receiving sensors, among a plurality of light beams passing through the plurality of regions and entering each of the sensor groups in a superposing manner, each of the sensor groups selectively receives only a light beam passing though the corresponding region among the plurality of regions and does not receive a light beam passing through a region other than the corresponding region, and
   the image generating unit generates an image of the subject based on the light beams selectively received by the respective sensor groups.

2. The imaging device according to claim 1, wherein
   the taking lens includes multi-focus lenses with different focal distances of the plurality of regions, and
   the image generating unit generates a plurality of images according to the focal distances of the plurality of the regions.

3. The imaging device according to claim 2, wherein
   the multi-focus lens is formed of a plurality of lens units corresponding to the plurality of regions, the plurality of lens units having an approximately equal distance arranged at different positions in an optical axis direction.

4. The imaging device according to claim 1, comprising a focal distance changing unit which changes at least one of the focal distances of the plurality of regions.

5. The imaging device according to claim 4, wherein
   the focal distance changing unit changes at least one of the focal distances of the plurality of regions by moving at least one of the two or more lenses in the optical axis direction.

6. The imaging device according to claim 4, wherein
   the focal distance changing unit changes at least one of the focal distances of the plurality of regions by rotating at least one of the two or more lenses about the optical axis direction.

7. The imaging device according to claim 4, comprising an optical member with a plurality of lenses disposed therein, wherein
   the focal distance changing unit changes at least one of the focal distances of the plurality of regions by moving the optical member so that any of the plurality of lenses is positioned on the optical axis of the taking lens.

8. The imaging device according to claim 4, comprising:
   a distance information obtaining unit which obtains information about a distance to the subject; and
   a focal distance change control unit which controls the focal distance changing unit so that at least one subject is in focus in any of the plurality of regions according to a distribution of subject distances obtained.

9. The imaging device according to claim 2, wherein
   the image generating unit generates a single image by combining a plurality of images according to the focal distances of the plurality of regions.

10. The imaging device according to claim 1, wherein
    the image generating unit generates a single image by using imaging signals from the plurality of light-receiving sensors corresponding to a plurality of regions with an equal focal distance among the plurality of regions.

11. The imaging device according to claim 1, wherein
    the taking lens is a taking lens with different focal lengths of the plurality of regions and an equal focal distance of the plurality of regions, and
    the image generating unit generates a plurality of images according to the focal lengths of the plurality of regions.

12. The imaging device according to claim 11, comprising a focal length changing unit which changes at least one of the focal lengths of the plurality of regions.

13. The imaging device according to claim 12, wherein
    the focal length changing unit changes at least one of the focal lengths of the plurality of regions by moving at least one of the two or more lenses in the optical axis direction.

14. The imaging device according to claim 12, comprising an optical member with a plurality of lenses disposed therein, wherein
    the focal length changing unit changes at least one of the focal lengths of the plurality of regions by moving the optical member so that any of the plurality of lenses is positioned on an optical axis of the taking lens.

15. The imaging device according to claim 11, wherein
    the image generating unit generates a single image from a plurality of imaging signals corresponding to the plurality of regions, and
    among the plurality of imaging signals, imaging signals for use in generating a partial region in the single image are more than imaging signals for use in generating regions other than the partial region.

16. The imaging device according to claim 15, wherein
    the single image has a resolution in the partial region higher than resolutions of regions other than the partial region.

17. The imaging device according to claim 1, wherein the image generated by the image generating unit is an image in which a subject at one focal distance corresponding to the light beam selectively received by each of the sensor groups is in focus and a subject at a distance other than the one focal distance is blurred according to a difference in distance from the one focal distance.

18. The imaging device according to claim 1, wherein the plurality of light-receiving sensors each have a light-shielding unit which shields a light beam passing through a region other than the corresponding region among the light beams passing through the plurality of regions of the taking lens.

19. An imaging device comprising:

a taking lens formed of one lens obtained by arranging a plurality of corresponding lens units in different regions with substantially equal focal lengths and positions that are shifted in an optical axis direction and by integrating the plurality of corresponding lens units;

an image pickup element having a plurality of light-receiving sensors two-dimensionally arranged to correspond to the plurality of lens units, the plurality of light-receiving sensors two-dimensionally arranged so as to configure a sensor group for each of the corresponding lens units and so that the sensor groups have imaging angles of views which substantially coincide with each other; and an image generating unit which generates an image of a subject from an imaging signal outputted from the image pickup element, wherein regardless of a position in the two-dimensional arrangement of the light-receiving sensors, among a plurality of light beams passing through the plurality of regions and entering each of the sensor groups in a superposing manner, each of the sensor groups selectively receives only a light beam passing though the corresponding lens unit among the plurality of lens units and does not receive a light beam passing through a lens unit other than the corresponding lens unit, and the image generating unit generates an image of the subject based on the light beams selectively received by the respective sensor groups.

20. The imaging device according to claim 19, wherein the image generated by the image generating unit is an image in which a subject at one focal distance corresponding to the light beam selectively received by each of the sensor groups is in focus and a subject at a distance other than the one focal distance is blurred according to a difference in distance from the one focal distance.

21. The imaging device according to claim 19, wherein the plurality of light-receiving sensors each have a light-shielding unit which shields a light beam passing through a lens unit other than the corresponding lens unit among the light beams passing through the plurality of lens units of the taking lens.

* * * * *